(12) United States Patent
Cao et al.

(10) Patent No.: US 10,687,001 B2
(45) Date of Patent: Jun. 16, 2020

(54) DUAL LENS SYSTEM HAVING A LIGHT SPLITTER

(71) Applicant: SZ DJI TECHNOLOGY CO., LTD., Shenzhen (CN)

(72) Inventors: Zisheng Cao, Shenzhen (CN); Mingyu Wang, Shenzhen (CN); Linchao Bao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/516,735

(22) Filed: Jul. 19, 2019

(65) Prior Publication Data

US 2019/0342506 A1 Nov. 7, 2019

Related U.S. Application Data

(63) Continuation of application No. 15/946,088, filed on Apr. 5, 2018, now Pat. No. 10,397,493, which is a
(Continued)

(51) Int. Cl.
*H04N 5/265* (2006.01)
*G06T 5/50* (2006.01)
(Continued)

(52) U.S. Cl.
CPC ............. *H04N 5/265* (2013.01); *G03B 17/17* (2013.01); *G06T 5/50* (2013.01); *H04N 5/2258* (2013.01);
(Continued)

(58) Field of Classification Search
None
See application file for complete search history.

(56) References Cited

U.S. PATENT DOCUMENTS 4,354,742 A 10/1982 Abel et al.
5,051,830 A 9/1991 Hoessle
(Continued)

FOREIGN PATENT DOCUMENTS

CN 1773322 A 5/2006
CN 1779498 A 5/2006
(Continued)

OTHER PUBLICATIONS

The European Patent Office (EPO) European Search Report and Search Opinion for EP Application No. 15874391 dated Apr. 10, 2017.
(Continued)

*Primary Examiner* — James M Hannett
(74) *Attorney, Agent, or Firm* — Anova Law Group, PLLC

(57) ABSTRACT

A system includes an optical element configured to separate light into a first light beam and a second light beam, a first lens module configured to focus the first light beam, a second lens module configured to focus the second light beam, a first sensor configured to capture a first image from the first light beam focused by the first lens module onto the first sensor, a second sensor configured to capture a second image from the second light beam focused by the second lens module onto the second sensor, and one or more processors configured to generate a combined image based on the first image and the second image. The first image has a first field of view and the second image has a second field of view different from the first field of view.

16 Claims, 15 Drawing Sheets

Related U.S. Application Data continuation of application No. 15/291,990, filed on Oct. 12, 2016, now Pat. No. 9,967,477, which is a continuation of application No. PCT/CN2015/083783, filed on Jul. 10, 2015.

(51) Int. Cl.

| | | |
|---|---|---|
| *H04N 5/225* | (2006.01) | |
| *H04N 5/232* | (2006.01) | |
| *H04N 5/247* | (2006.01) | |
| *G03B 17/17* | (2006.01) | |
| *G02B 5/00* | (2006.01) | |
| *G02B 27/10* | (2006.01) | |

(52) U.S. Cl.
CPC ..... *H04N 5/23212* (2013.01); *H04N 5/23232* (2013.01); *H04N 5/23238* (2013.01); *H04N 5/247* (2013.01); *G02B 5/005* (2013.01); *G02B 27/106* (2013.01); *G06T 2207/10148* (2013.01); *G06T 2207/20221* (2013.01)

(56) References Cited

U.S. PATENT DOCUMENTS

| | | | |
|---|---|---|---|
| 6,728,044 | B2 | 4/2004 | Akiyama et al. |
| 6,870,690 | B1 | 3/2005 | Lawson et al. |
| 7,049,597 | B2 | 5/2006 | Bodkin |
| 7,119,969 | B1 | 10/2006 | Amon et al. |
| 7,573,654 | B2 | 8/2009 | Bietry et al. |
| 7,764,440 | B2 | 7/2010 | Border et al. |
| 7,948,515 | B1 | 5/2011 | Hines |
| 8,553,106 | B2 | 10/2013 | Scarff |
| 8,660,420 | B2 | 2/2014 | Chang |
| 9,967,477 | B2 * | 5/2018 | Cao .................. H04N 5/247 |
| 10,397,493 | B2 * | 8/2019 | Cao .................. H04N 5/23232 |
| 2002/0097505 | A1 | 7/2002 | Delong |
| 2002/0167593 | A1 | 11/2002 | Nakayama et al. |
| 2007/0120988 | A1 | 5/2007 | Akiyama et al. |
| 2008/0030592 | A1 | 2/2008 | Border et al. |
| 2008/0219654 | A1 * | 9/2008 | Border .............. H04N 5/23212 396/89 |
| 2008/0266432 | A1 | 10/2008 | Tsuruoka |
| 2009/0256909 | A1 | 10/2009 | Nixon |
| 2009/0262140 | A1 | 10/2009 | Mochizuki |
| 2010/0214468 | A1 | 8/2010 | Caron et al. |
| 2010/0277619 | A1 | 11/2010 | Scarff |
| 2011/0164157 | A1 | 7/2011 | Katsuda |
| 2011/0187833 | A1 | 8/2011 | Hines |
| 2012/0013757 | A1 * | 1/2012 | Beckers .............. G03B 35/06 348/222.1 |
| 2013/0265311 | A1 | 10/2013 | Na et al. |
| 2014/0036112 | A1 * | 2/2014 | Scarff .............. H04N 5/2258 348/240.1 |
| 2015/0029424 | A1 | 1/2015 | Gordon et al. |
| 2015/0085174 | A1 | 3/2015 | Shabtay et al. |
| 2016/0050374 | A1 * | 2/2016 | Shabtay .............. H04N 5/2258 348/240.3 |

FOREIGN PATENT DOCUMENTS

| | | |
|---|---|---|
| CN | 101999129 A | 3/2011 |
| CN | 102109741 A | 6/2011 |
| EP | 1976268 A | 10/2008 |
| EP | 2208974 A1 | 7/2010 |
| JP | 2001103466 A | 4/2001 |
| JP | 2002335435 A | 11/2002 |
| JP | 2003319231 A | 11/2003 |
| JP | 2004297332 A | 10/2004 |
| JP | 2006186983 A | 7/2006 |
| JP | 2007050841 A | 3/2007 |
| JP | 2007077730 A | 3/2007 |
| JP | 2007180730 A | 7/2007 |
| JP | 2009173263 A | 8/2009 |
| JP | 2009194425 A | 8/2009 |
| JP | 2011055246 A | 3/2011 |
| JP | 2011139325 A | 7/2011 |
| JP | 2012521673 A | 9/2012 |
| JP | 2015514263 A | 5/2015 |

OTHER PUBLICATIONS

The World Intellectual Property Organization (WIPO) International Search Report and Written Opinion for PCT/CN2015/083783 dated Apr. 5, 2016.

\* cited by examiner

DUAL LENS SYSTEM HAVING A LIGHT SPLITTER

CROSS REFERENCE TO RELATED APPLICATIONS

This application is a continuation of application Ser. No. 15/946,088, filed Apr. 5, 2018, now U.S. Pat. No. 10,397,493, which is a continuation of application Ser. No. 15/291,990, filed Oct. 12, 2016, now U.S. Pat. No. 9,967,477, which is a continuation of International Application No. PCT/CN2015/083783, filed Jul. 10, 2015, the disclosures of all of which are hereby incorporated by reference in their entirety.

BACKGROUND

Imaging devices of wide ranging sizes and capabilities have been developed for a variety of applications. For example, imaging devices may be used as a stand-alone device by professional photographers or cinematographers. In some instances, imaging devices may be integrated as a component into systems having other various capabilities (e.g., smart phones, tablets). In some instances, imaging devices may be carried on board movable objects, such as unmanned aerial vehicles (UAVs), and be utilized for surveillance, search and rescue operations, exploration, and other activities.

A plurality of optical modules may be provided within an imaging system. The optical modules may have a specific configuration and/or be coupled to an optical element. The optical modules may each acquire images. The acquired images may be combined and images having arbitrary magnification may be generated. Existing approaches for generation of images may be less than optimal in some instances. For example, optical zooming systems may be heavy, large, and expensive. Digital zooming systems may have poor performance. Furthermore, existing image generation systems may be subject to computational difficulties and ghosting problems.

SUMMARY

Embodiments disclosed herein provide systems and methods for capturing images and/or generating a combined image. Imaging devices may be utilized in capturing the images and/or acquiring the combined image. The imaging devices may capture two or more images at a given time point. The two or more images may or may not have an optical parallax. A center of the two or more images may coincide. In some instances, the two or more images may be combined to generate a combined image. Advantageously, the approaches described herein may eliminate needs for complex image matching algorithms, needs for image depth estimation, and matching accuracy may be improved with less computational loads in generating a combined image.

Thus, in one aspect, a method for capturing images is provided. The method comprises: separating, with aid of an optical element, light into a first light beam and a second light beam; focusing, with aid of a first lens module having a first local length, the first light beam; focusing, with aid of a second lens module having a second focal length, the second light beam, wherein the second focal length is different from the first focal length; capturing, with aid of a first sensor, a first image from the first light beam focused by the first lens module onto the first sensor; and capturing, with aid of a second sensor, a second image from the second light beam focused by the second lens module onto the second sensor.

In some embodiments, the first image has a first field of view and the second image has a second field of view different from the first field of view. In some embodiments, the second field of view covers the second field of view. In some embodiments, the first field of view covers the second field of view. In some embodiments, the first light beam is a reflected part of the light and the second light beam is a refracted part of the light. In some embodiments, the first lens module is a telescope lens module and the second lens module is a wide-angled lens module. In some embodiments, the first lens module comprises a wide-angled lens module and the second lens module comprises a telescope lens module. In some embodiments, an optical axis of the first lens module and an optical axis of the second lens module coincide with respect to an angular bisector of a reflection angle and a refraction angle. In some embodiments, an optical axis of the first lens module and an optical axis of the second lens module coincide with each other. In some embodiments, the optical axis of the first lens module and an optical axis of the second lens module are perpendicular. In some embodiments, the light passes through a single aperture prior to contact with the optical element. In some embodiments, a center of the first image and the second image coincide. In some embodiments, the optical element is a translucent film reflector. In some embodiments, the optical element is a beam splitter. In some embodiments, the first lens module and the second lens module each comprise only prime lenses. In some embodiments, the first sensor and the second sensor are of a same type. In some embodiments, the first sensor and the second sensor have identical sizes. In some embodiments, a size of each pixel on the first sensor and the second sensor are identical. In some embodiments, the first sensor and the second sensor are of a different type. In some embodiments, an optical parallax is absent between an optical axis of the first lens module and an optical axis of the second lens module. In some embodiments, a parallax is absent between the first image and the second image. In some embodiments, the method further comprises combining, with aid of one or more processors, the first image with the second image. In some embodiments, the method further comprises receiving, at one or more processors, a desired focal length, wherein the combined image has a field of view corresponding to the desired focal length. In some embodiments, the desired focal length corresponds to a desired field of view. In some embodiments, the desired focal length is equal to or greater than at least one of the first focal length or the second focal length. In some embodiments, combining the first image with the second image comprises scaling the first image by $$\frac{\text{the desired focal length}}{\text{the first focal length}}$$

and the second image by $$\frac{\text{the desired focal length}}{\text{the second focal length}}.$$

In some embodiments, scaling the first image and second image utilize a cubic interpolation algorithm or a bilinear interpolation algorithm. In some embodiments, combining the first image with the second image comprises fusing the scaled first image and the scaled second image. In some embodiments, the combined image is comprised wholly of fused parts when the desired focal length is greater than the first focal length and the second focal length. In some embodiments, the combined image is comprised of an inner field of view comprised of fused parts and an outer field of view comprised of the first scaled image or the second scaled image, whichever has a wider field of view when the desired focal length is between the first focal length and the second focal length. In some embodiments, fusing the scaled first image and the scaled second image utilizes a Laplacian pyramid algorithm or a weighted average algorithm. In some embodiments, pixel fusion occurs for areas in which a field of view of the first scaled image and the second scaled image overlaps. In some embodiments, the first lens module comprises at least one lens. In some embodiments, the first lens module comprises a lens barrel configured to receive the at least one lens. In some embodiments, the second lens module comprises at least one lens. In some embodiments, the second lens module comprises a lens barrel configured to receive the at least one lens.

In another aspect, a system for capturing images is provided. The system comprises: an optical element configured to separate light into a first light beam and a second light beam; a first lens module having a first focal length configured to focus the first light beam; a second lens module having a second focal length configured to focus the second light beam, wherein the second focal length is different from the first local length; a first sensor configured to capture a first image from the first light beam focused by the first lens module onto the first sensor; and a second sensor configured to capture a second image from the second light beam focused by the second lens module onto the second sensor.

In some embodiments, the first image has a first field of view and the second image has a second field of view different from the first field of view. In some embodiments, the second field of view covers the second field of view. In some embodiments, the first field of view covers the second field of view. In some embodiments, the first light beam is a reflected part of the light and the second light beam is a refracted part of the light. In some embodiments, the first lens module is a telescope lens module and the second lens module is a wide-angled lens module. In some embodiments, the first lens module comprises a wide-angled lens module and the second lens module comprises a telescope lens module. In some embodiments, an optical axis of the first lens module and an optical axis of the second lens module coincide with respect to an angular bisector of a reflection angle and a refraction angle. In some embodiments, an optical axis of the first lens module and an optical axis of the second lens module coincide with each other. In some embodiments, the optical axis of the first lens module and an optical axis of the second lens module are perpendicular. In some embodiments, the light passes through a single aperture prior to contact with the optical element. In some embodiments, a center of the first image and the second image coincide. In some embodiments, the optical element is a translucent film reflector. In some embodiments, the optical element is a beam splitter. In some embodiments, the first lens module and the second lens module each comprise only prime lenses. In some embodiments, the first sensor and the second sensor are of a same type. In some embodiments, the first sensor and the second sensor have identical sizes. In some embodiments, a size of each pixel on the first sensor and the second sensor are identical. In some embodiments, the first sensor and the second sensor are of a different type. In some embodiments, an optical parallax is absent between an optical axis of the first lens module and an optical axis of the second lens module. In some embodiments, a parallax is absent between the first image and the second image. In some embodiments, the system further comprises one or more processors, wherein the one or more processors are configured to combine the first image with the second image. In some embodiments, the one or more processors are configured to receive a desired focal length and generate a combined image, wherein the combined image has a field of view corresponding to the desired focal length. In some embodiments, the desired focal length corresponds to a desired field of view. In some embodiments, the desired focal length is equal to or greater than at least one of the first focal length or the second focal length. In some embodiments, the one or more processors are configured to scale the first image by $$\frac{\text{the desired focal length}}{\text{the first focal length}}$$

and the second image by $$\frac{\text{the desired focal length}}{\text{the second focal length}}.$$

In some embodiments, the one or more processors are configured to utilize a cubic interpolation algorithm or a bilinear interpolation algorithm to scale the first image and the second image. In some embodiments, the one or more processors are configured to fuse the scaled first image and the scaled second image. In some embodiments, the combined image is comprised wholly of fused parts when the desired focal length is greater than the first focal length and the second focal length. In some embodiments, the combined image is comprised of an inner field of view comprised of fused parts and an outer field of view comprised of the first scaled image or the second scaled image, whichever has a wider field of view when the desired focal length is between the first focal length and the second focal length. In some embodiments, the one or more processors are configured to utilize a Laplacian pyramid algorithm or a weighted average algorithm to fuse the scaled first image and the scaled second image. In some embodiments, the one or more processors are configured to fuse the scaled first image and the scaled second image via pixel fusion. In some embodiments, pixel fusion occurs for areas in which a field of view of the first scaled image and the second scaled image overlaps. In some embodiments, the first lens module comprises at least one lens. In some embodiments, the first lens module comprises a lens barrel configured to receive the at least one lens. In some embodiments, the second lens module comprises at least one lens. In some embodiments, the second lens module comprises a lens barrel configured to receive the at least one lens.

In another aspect, a method for generating a combined image is provided. The method comprises: acquiring, with aid of a first lens module, a first image; acquiring, with aid of a second lens module, a second image, wherein an optical axis of the first lens module and an optical axis of the second lens module coincide and are perpendicular; receiving, at one or more processors, the first image; receiving, at one or more processors, the second image; and combining, with aid of one or more processors, the first image with the second image.

In some embodiments, the first image has a first field of view and the second image has a second field of view different from the first field of view. In some embodiments, the first lens module has a first focal length f1 and the second lens module has a second focal length f2, wherein f1 is greater than f2. In some embodiments, a field of view of the second lens module is greater than a field of view of the first lens module. In some embodiments, the method further comprises receiving, at the one or more processors, a desired focal length f, wherein the combined image has a field of view corresponding to the desired focal length f. In some embodiments, combining the first image with the second image comprises scaling the first image by $$\frac{f}{f1}$$

and the second image by $$\frac{f}{f2}.$$

In some embodiments, scaling the first and second images utilizes a cubic interpolation algorithm or a bilinear interpolation algorithm. In some embodiments, combining the first image with the second image comprises fusing the scaled first image and the scaled second image. In some embodiments, the combined image is comprised wholly of fused parts when f is greater than f1. In some embodiments, the combined image is comprised of an inner field of view comprised of fused parts and an outer field of view comprised of the second scaled image when the desired focal length is between the first focal length and the second focal length. In some embodiments, fusing the scaled first image and the scaled second image utilizes a Laplacian pyramid algorithm or a weighted average algorithm. In some embodiments, fusing the scaled first image and the scaled second image comprises pixel fusion. In some embodiments, pixel fusion occurs for areas in which a field of view of the first scaled image and the second scaled image overlaps. In some embodiments, the first lens module is a telescope lens module and the second lens module is a wide-angled lens module. In some embodiments, the first lens module and the second lens module each comprise only prime lenses. In some embodiments, an optical parallax is absent between an optical axis of the first lens and an optical axis of the second lens. In some embodiments, a parallax is absent between the first image and the second image. In some embodiments, the combined image is displayed on a mobile device. In some embodiments, the mobile device is a cellphone, PDA, tablet, or controller. In some embodiments, the combined image is displayed in real time.

In another aspect, an imaging system for generating a combined image is provided. The system comprises: a first lens module configured to aid in acquiring a first image; a second lens module configured to aid in acquiring a second image, wherein an optical axis of the first lens module and an optical axis of the second lens module coincide and are perpendicular; and one or more processors individually or collectively configured to: receive the first image; receive the second image; and combine the first image with the second image.

In some embodiments, the first image has a first field of view and the second image has a second field of view different from the first field of view. In some embodiments, the first lens module has a first focal length f1 and the second lens module has a second focal length f2, wherein f1 is greater than f2. In some embodiments, a field of view of the second lens module is greater than a field of view of the first lens module. In some embodiments, the one or more processors are configured to receive a desired focal length f and generate a combined image, wherein the combined image has a field of view corresponding to the desired focal length f. In some embodiments, the one or more processors are configured to scale the first image by $$\frac{f}{f1}$$

and the second image by $$\frac{f}{f2}.$$

In some embodiments, the one or more processors are configured to utilize a cubic interpolation algorithm or a bilinear interpolation algorithm to scale the first image and the second image. In some embodiments, the one or more processors are configured to fuse the scaled first image and the scaled second image. In some embodiments, a combined image is comprised wholly of fused parts when f is greater than f1. In some embodiments, a combined image is comprised of an inner field of view comprised of fused parts and an outer field of view comprised of the second scaled image when the desired focal length is between the first focal length and the second focal length. In some embodiments, the one or more processors are configured to utilize a Laplacian pyramid algorithm or a weighted average algorithm to fuse the scaled first image and the scaled second image. In some embodiments, the one or more processors are configured to utilize pixel fusion to fuse the scaled first image and the scaled second image. In some embodiments, the one or more processors are configured to utilize pixel fusion occurs for areas in which a field of view of the first scaled image and the second scaled image overlaps. In some embodiments, the first lens module is a telescope lens module and the second lens module is a wide-angled lens module. In some embodiments, the first lens module and the second lens module each comprise only prime lenses. In some embodiments, an optical parallax is absent between an optical axis of the first lens and an optical axis of the second lens. In some embodiments, a parallax is absent between the first image and the second image. In some embodiments, the system further comprises a mobile device configured to display the combined image. In some embodiments, the mobile device is a cellphone, PDA, tablet, or controller. In some embodiments, the combined image is displayed in real time.

In another aspect, a movable system is provided. The movable system comprises: a movable platform; the imaging system previously described herein configured to be mounted on the movable platform; and a gimbal configured to stabilize the imaging system. In some embodiments, the gimbal is configured to rotate the imaging system with respect to the movable platform.

In another aspect, a method for capturing images is provided. The method comprises: effecting movement of a movable platform; receiving, at an imaging device, light, wherein the imaging device comprises an optical element, a first lens module, a second lens module, a first sensor, and a second sensor; separating, with aid of the optical element, the light into a first light beam and a second light beam; focusing, with aid of the first lens module, the first light beam; focusing, with aid of the second lens module, the second light beam; capturing, with aid of the first sensor, a first image from the first light beam focused by the first lens module onto the first sensor; and capturing, with aid of the second sensor, a second image from the second light beam focused by the second lens module onto the second sensor.

In some embodiments, the movable platform is an unmanned aerial vehicle. In some embodiments, movement of the movable platform is effected with aid of one or more propulsion units. In some embodiments, the first lens module has a first focal length and the second lens module has a second focal length different from the first focal length. In some embodiments, the first focal length is greater than the second focal length. In some embodiments, a field of view of the second lens module is greater than a field of view of the first lens module. In some embodiments, the first light beam is a reflected part of the light and the second light beam is a refracted part of the light. In some embodiments, an optical axis of the first lens module and an optical axis of the second lens module coincide with respect to an angular bisector of a reflection angle and a refraction angle. In some embodiments, the first lens module is a telescope lens module and the second lens module is a wide-angled lens module. In some embodiments, the first lens module comprises at least one lens. In some embodiments, the first lens module comprises a lens barrel configured to receive the at least one lens. In some embodiments, the first lens module is a wide-angled lens module and the second lens is a telescope lens module. In some embodiments, the method further comprises combining, with aid of one or more processors, the first image with the second image. In some embodiments, the method further comprises receiving, at one or more processors, a desired focal length, wherein the combined image has a field of view corresponding to the desired focal length. In some embodiments, the desired focal length is equal to or greater than at least one of the first focal length or the second focal length. In some embodiments, the method further comprises displaying the combined image on a mobile device. In some embodiments, the mobile device is a cellphone, PDA, tablet, or controller. In some embodiments, the combined image is displayed in real time. In some embodiments, combining the first image with the second image comprises scaling the first image by $$\frac{\text{the desired focal length}}{\text{the first focal length}}$$

and the second image by $$\frac{\text{the desired focal length}}{\text{the second focal length}}.$$

In some embodiments, scaling the first image and second image utilize a cubic interpolation algorithm or a bilinear interpolation algorithm. In some embodiments, combining the first image with the second image comprises fusing the scaled first image and the scaled second image. In some embodiments, the combined image is comprised wholly of fused parts when the desired focal length is greater than the first focal length and the second focal length. In some embodiments, the combined image is comprised of an inner field of view comprised of fused parts and an outer field of view comprised of the first scaled image or the second scaled image, whichever has a wider field of view when the desired focal length is between the first focal length and the second focal length. In some embodiments, fusing the scaled first image and the scaled second image utilizes a Laplacian pyramid algorithm or a weighted average algorithm. In some embodiments, fusing the scaled first image and the scaled second image comprises pixel fusion. In some embodiments, pixel fusion occurs for areas in which a field of view of the first scaled image and the second scaled image overlaps. In some embodiments, an optical axis of the first lens module and an optical axis of the second lens module coincide. In some embodiments, the optical axis of the first lens module and an optical axis of the second lens module are perpendicular. In some embodiments, the light passes through a single aperture prior to contact with the optical element. In some embodiments, a center of the first image and the second image coincide. In some embodiments, the optical element is a translucent film reflector. In some embodiments, the optical element is a beam splitter. In some embodiments, the first lens module and the second lens module comprise only prime lenses. In some embodiments, the first lens module is a telescope lens module and the second lens module is a wide-angled lens module. In some embodiments, the first sensor and the second sensor are of a same type. In some embodiments, the first sensor and the second sensor are of a different type. In some embodiments, an optical parallax is absent between an optical axis of the first lens module and an optical axis of the second lens module. In some embodiments, a parallax is absent between the first image and the second image. In some embodiments, the method further comprises mounting the imaging device to the movable platform with a gimbal. In some embodiments, the gimbal is configured stabilize the imaging device. In some embodiments, the gimbal is configured to rotate the imaging device with respect to the moveable platform.

In another aspect, a system for capturing images is provided. The system comprises: a moveable platform; and an imaging device mounted on the moveable platform configured to receive light, wherein the imaging device comprises: an optical element configured to separate the light into a first light beam and a second light beam; a first lens module configured to focus the first light beam; a second lens module configured to focus the second light beam; a first sensor configured to capture a first image from the first light beam focused by the first lens module onto the first sensor; and a second sensor configured to capture a second image from the second light beam focused by the second lens module onto the second sensor.

In some embodiments, the moveable platform is an unmanned aerial vehicle. In some embodiments, movement of the moveable platform is effected with aid of one or more propulsion units. In some embodiments, the first lens module has a first focal length and the second lens module has a second focal length different from the first focal length. In some embodiments, the first focal length is greater than the second focal length. In some embodiments, a field of view of the second lens module is greater than a field of view of the first lens module. In some embodiments, the first light beam is a reflected part of the light and the second light beam is a refracted part of the light. In some embodiments, an optical axis of the first lens module and an optical axis of the second lens module coincide with respect to an angular bisector of a reflection angle and a refraction angle. In some embodiments, the first lens module is a telescope lens module and the second lens module is a wide-angled lens module. In some embodiments, the first lens module comprises at least one lens. In some embodiments, the first lens module comprises a lens barrel configured to receive the at least one lens. In some embodiments, the first lens module is a wide-angled lens module and the second lens is a telescope lens module. In some embodiments, the system further comprises one or more processors, wherein the one or more processors are configured to combine the first image with the second image. In some embodiments, the one or more processors are configured to receive a desired focal length and generate a combined image having a field of view corresponding to the desired focal length. In some embodiments, the desired focal length is equal to or greater than at least one of the first focal length or the second focal length. In some embodiments, the system further comprises a mobile device configured to display the combined image. In some embodiments, the mobile device is a cellphone, PDA, tablet, or controller. In some embodiments, the combined image is displayed in real time. In some embodiments, the one or more processors are configured to scale the first image by $$\frac{\text{the desired focal length}}{\text{the first focal length}}$$

and the second image by $$\frac{\text{the desired focal length}}{\text{the second focal length}}$$

to generate the combined image. In some embodiments, the one or more processors are configured to utilize a cubic interpolation algorithm or a bilinear interpolation algorithm to scale the first image and the second image. In some embodiments, the one or more processors are configured to fuse the scaled first image and the scaled second image to generate the combined image. In some embodiments, the combined image is comprised wholly of fused parts when the desired focal length is greater than the first focal length and the second focal length. In some embodiments, the combined image is comprised of an inner field of view comprised of fused parts and an outer field of view comprised of the first scaled image or the second scaled image, whichever has a wider field of view when the desired focal length is between the first focal length and the second focal length. In some embodiments, the one or more processors are configured to utilize a Laplacian pyramid algorithm or a weighted average algorithm to fuse the scaled first image and the scaled second image. In some embodiments, one or more processors are configured to fuse the scaled first image and the scaled second image via pixel fusion. In some embodiments, pixel fusion occurs for areas in which a field of view of the first scaled image and the second scaled image overlaps. In some embodiments, an optical axis of the first lens module and an optical axis of the second lens module coincide. In some embodiments, the optical axis of the first lens module and an optical axis of the second lens module are perpendicular. In some embodiments, the light passes through a single aperture prior to contact with the optical element. In some embodiments, a center of the first image and the second image coincide. In some embodiments, the optical element is a translucent film reflector. In some embodiments, the optical element is a beam splitter. In some embodiments, the first lens module and the second lens module comprise only prime lenses. In some embodiments, the first lens module is a telescope lens module and the second lens module is a wide-angled lens module. In some embodiments, the first sensor and the second sensor are of a same type. In some embodiments, the first sensor and the second sensor are of a different type. In some embodiments, an optical parallax is absent between an optical axis of the first lens module and an optical axis of the second lens module. In some embodiments, a parallax is absent between the first image and the second image. In some embodiments, the system further comprises a gimbal configured to mount the imaging device to the moveable platform. In some embodiments, the gimbal is configured stabilize the imaging device. In some embodiments, the gimbal is configured to rotate the imaging device with respect to the moveable platform.

In another aspect, a method for capturing images is provided. The method comprises: separating, with aid of an optical element, light into a first light beam and a second light beam; focusing, with aid of a first lens module, the first light beam; focusing, with aid of a second lens module, the second light beam; capturing, with aid of a first sensor, a first image from the first light beam focused by the first lens module onto the first sensor, wherein the first sensor has a first sensor size; and capturing, with aid of a second sensor, a second image from the second light beam focused by the second lens module onto the second sensor, wherein the second sensor has a second sensor size different from the first size.

In some embodiments, the first image has a first field of view and the second image has a second field of view different from the first field of view. In some embodiments, the first light beam is a reflected part of the light and the second light beam is a refracted part of the light. In some embodiments, an optical axis of the first lens module and an optical axis of the second lens module coincide with respect to an angular bisector of a reflection angle and a refraction angle. In some embodiments, the first lens module and the second lens module have identical focal lengths. In some embodiments, the first sensor size is larger than the second sensor size. In some embodiments, each individual pixel on the first sensor is equal to or larger than each individual pixel on the second sensor. In some embodiments, an optical axis of the first lens module and an optical axis of the second lens module coincide. In some embodiments, the optical axis of the first lens module and an optical axis of the second lens module are perpendicular. In some embodiments, the light passes through a single aperture prior to contact with the optical element. In some embodiments, a center of the first image and the second image coincide. In some embodiments, the optical element is a translucent film reflector. In some embodiments, the optical element is a beam splitter. In some embodiments, the first lens module and the second lens module comprise only prime lenses. In some embodiments, the first sensor and the second sensor are of a same type. In some embodiments, the first sensor and the second sensor are of a different type. In some embodiments, an optical parallax is absent between an optical axis of the first lens module and an optical axis of the second lens module. In some embodiments, a parallax is absent between the first image and the second image. In some embodiments, the method further comprises combining, with aid of one or more processors, the first image with the second image. In some embodiments, the method further comprises receiving, at one or more processors, a desired field of view, wherein the combined image has a combined field of view corresponding to the desired field of view. In some embodiments, the first image has a first field of view and the second image has a second field of view different from the first field of view. In some embodiments, the desired field of view is equal to or narrower than at least one of the first field of view or the second field of view. In some embodiments, the first sensor size is larger than the second sensor size. In some embodiments, the first field of view is wider than the second field of view. In some embodiments, the first sensor comprises pixels having a first pixel size and the second sensor comprises pixels having a second pixel size, wherein the first pixel size is equal to or larger than the second pixel size. In some embodiments, combining the first image with the second image comprises scaling the first image by $$\frac{\text{the first pixel size}}{\text{the second pixel size}}.$$

In some embodiments, scaling the first image utilize a cubic interpolation algorithm or a bilinear interpolation algorithm. In some embodiments, combining the first image with the second image comprises fusing the scaled first image and the second image. In some embodiments, the combined image is comprised wholly of fused parts when the desired field of view is narrower than the first field of view and the second field of view. In some embodiments, the combined image is comprised of an inner field of view comprised of fused parts and an outer field of view comprised of the first scaled image when the desired field of view is between the first field of view and the second field of view. In some embodiments, fusing the scaled first image and the second image utilizes a Laplacian pyramid algorithm or a weighted average algorithm. In some embodiments, fusing the scaled first image and the second image comprises pixel fusion. In some embodiments, pixel fusion occurs for areas in which a field of view of the first scaled image and the second scaled image overlaps. In some embodiments, the method further comprises scaling the fused image to a desired size.

In another aspect, an imaging system for capturing images is provided. The system comprises: an optical element configured to separate light into a first light beam and a second light beam; a first lens module configured to focus the first light beam; a second lens module configured to focus the second light beam; a first sensor configured to capture a first image from the first light beam focused by the first lens module onto the first sensor, wherein the first sensor has a first sensor size; and a second sensor configured to capture a second image from the second light beam focused by the second lens module onto the second sensor, wherein the second sensor has a second sensor size different from the first sensor size.

In some embodiments, the first image has a first field of view and the second image has a second field of view different from the first field of view. In some embodiments, the first light beam is a reflected part of the light and the second light beam is a refracted part of the light. In some embodiments, an optical axis of the first lens module and an optical axis of the second lens module coincide with respect to an angular bisector of a reflection angle and a refraction angle. In some embodiments, the first lens module and the second lens module have identical focal lengths. In some embodiments, the first sensor size is larger than the second sensor size. In some embodiments, each individual pixel on the first sensor is equal to or larger than each individual pixel on the second sensor. In some embodiments, an optical axis of the first lens module and an optical axis of the second lens module coincide. In some embodiments, the optical axis of the first lens module and an optical axis of the second lens module are perpendicular. In some embodiments, the light passes through a single aperture prior to contact with the optical element. In some embodiments, a center of the first image and the second image coincide. In some embodiments, the optical element is a translucent film reflector. In some embodiments, the optical element is a beam splitter. In some embodiments, the first lens module and the second lens module comprise only prime lenses. In some embodiments, the first sensor and the second sensor are of a same type. In some embodiments, the first sensor and the second sensor are of a different type. In some embodiments, an optical parallax is absent between an optical axis of the first lens module and an optical axis of the second lens module. In some embodiments, a parallax is absent between the first image and the second image. In some embodiments, the system further comprises one or more processors, wherein the one or more processors are configured to combine the first image with the second image. In some embodiments, the one or more processors are configured to receive a desired field of view and generate a combined image, and the combined image has a combined field of view corresponding to the desired field of view. In some embodiments, the first image has a first field of view and the second image has a second field of view different from the first field of view. In some embodiments, the desired field of view is equal to or narrower than at least one of the first field of view or the second field of view. In some embodiments, the first sensor size is larger than the second sensor size. In some embodiments, the first field of view is wider than the second field of view. In some embodiments, the first sensor comprises pixels having a first pixel size and the second sensor comprises pixels having a second pixel size, wherein the first pixel size is equal to or larger than the second pixel size. In some embodiments, the one or more processors are configured to scale the first image by $$\frac{\text{the first pixel size}}{\text{the second pixel size}}$$

to generate the combined image. In some embodiments, the one or more processors are configured to utilize a cubic interpolation algorithm or a bilinear interpolation algorithm to scale the first image. In some embodiments, the one or more processors are configured fuse the scaled first image and the second image to generate the combined image. In some embodiments, the combined image is comprised wholly of fused parts when the desired field of view is narrower than the first field of view and the second field of view. In some embodiments, the combined image is comprised of an inner field of view comprised of fused parts and an outer field of view comprised of the first scaled image when the desired field of view is between the first field of view and the second field of view. In some embodiments, the one or more processors are configured to utilize a Laplacian pyramid algorithm or a weighted average algorithm to fuse the scaled first image and the second image. In some embodiments, the one or more processors are configured to fuse the scaled first image and the second image via pixel fusion. In some embodiments, pixel fusion occurs for areas in which a field of view of the first scaled image and the second scaled image overlaps. In some embodiments, the one or more processors are configured to scale the combined image to a desired size.

In another aspect, a movable system is provided. The movable system comprises: a movable platform; the imaging system previously described herein configured to be mounted on the movable platform; and a gimbal configured to stabilize the imaging system.

In some embodiments, the gimbal is configured to rotate the imaging system with respect to the movable platform.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

A need exists for imaging systems that are able to capture high quality (e.g., high resolution) images with varying fields of views and/or varying magnifications. In some instances, it may be beneficial for the imaging systems to be small in size (e.g., volume) and low in weight in order for them to be incorporated into other devices (e.g., cell phones) or be coupled to movable objects (e.g., unmanned aerial vehicles).

An imaging system as described herein may acquire two or more images of differing fields of views from a common line of sight. In some instances, the imaging system may comprise two or more optical modules. In some instances, the two or more optical modules may comprise lens modules of different focal lengths and/or sensors of different sizes, as further described below. The two or more images may be captured at any given time point. Because the two or more images are acquired from a common line of sight, there may not be an optical parallax between the acquired images. Because the two or more images are acquired from a common line of sight, a center of the two or more images may coincide (e.g., coincide exactly). Because the two or more images are acquired from a common line of sight, there may not be an optical parallax between the acquired images. The two or more images may be fused to generate images of arbitrary magnification (e.g., arbitrary field of view) as desired.

Figure 1:
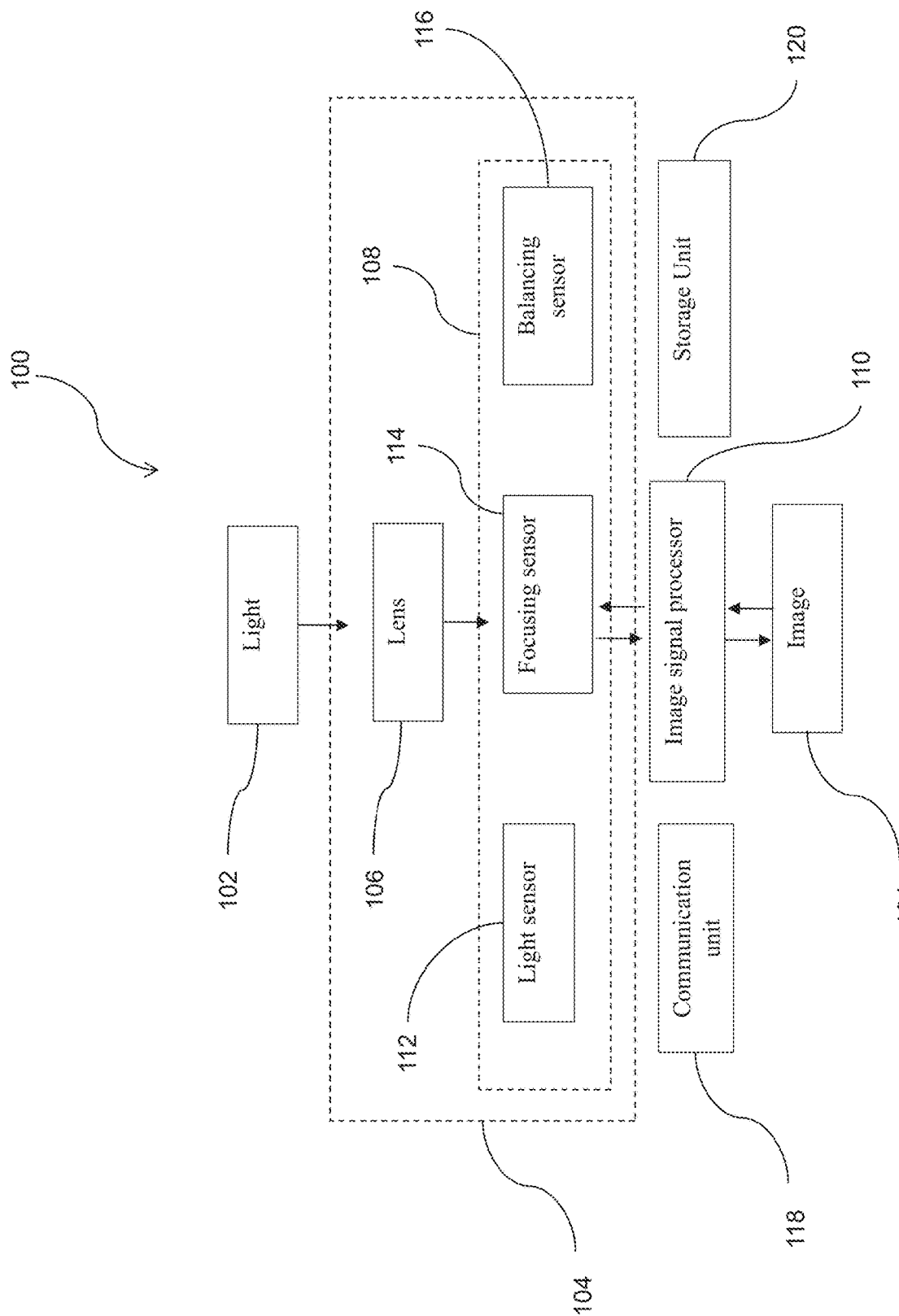
FIG. 1 illustrates an imaging system, in accordance with embodiments.

FIG. 1 illustrates an imaging system. The imaging system 100 may intake light 102 and output an image 104 (e.g., on a display). The imaging system may comprise an optical module 104 which may include one or more lenses 106 and/or image sensors 108. A lens may be a prime lens. A prime lens may have a fixed, single focal length. A lens may be a zoom lens, as further described below. An imaging system may comprise one or more sensors. For example, an imaging system may comprise a light sensor 112 with photosites to collect and store photons. The light sensor may further convert the collected information (e.g., photons) to a digital form (e.g., capturing an image). For example, an imaging system may comprise a focusing sensor 114 to determine a correct focus of an image that is to be captured. For example, an imaging system may comprise a balancing sensor (e.g., a white balance sensor) 116 to balance color of a captured image (e.g., to match that of human vision). In some instances, one image sensor 108 may comprise functions of a plurality of sensors. For example, one sensor may be used to detect and convey light into a form that conveys an image (e.g., capture an image) as well as focus and balance the image (e.g., white balance). An image processor 110 may process the captured images and perform image processing functions such as black level correction, surrounding light ratio correction, distortion correction, white balance correction, color crosstalk correction, de-mosaic, color correction, gray scale mapping, color space conversion, sharpening, and noise removal to generate an image for viewing. The imaging system may further comprise a communication unit 118 and/or storage unit 120. A communication unit may be used for communication with external components and/or devices, e.g., mobile devices such as mobile phones, tablets, PCs, remote controllers, etc. The communication unit, for example, may be used in sending images captured by the imaging system (e.g., output), or receiving inputs (e.g., control signals) from the external components or devices. The communication unit may also be used to transform images via digital signal processing (DSP) to improve captured images (e.g., by the image sensor) in some way. The storage unit may be used for temporarily or permanently storing image(s) captured by the imaging system.

In many instances, it may be desirable to capture (e.g., generate) high quality images using imaging systems. In many instances, it may be desirable to provide imaging systems with a zoom capability to capture images of an environment far away from the imaging systems. The imaging systems may utilize an optical zooming system, a digital zooming system, a multi-lens digital zooming system, or a combination thereof.

An optical zooming system may enlarge an image with the aid of a set of optical lenses (e.g., zoom lens). A zoom lens may have variable focal lengths and the focal length may encompass a plurality of focal lengths (e.g., focal length range). An optical zoom lens may vary the focal length by a relative movement of a set of internal lens elements. However, imaging devices having a zoom lens that cover a wide zoom range may be large in size, heavy in weight and expensive in cost which may not be suitable for use when the imaging device is carried by a movable object or wherein the imaging device is integrated as a component.

A digital zooming system may simulate an optical zooming system by using image processing algorithms (e.g., super-resolution algorithms) to enlarge a portion of a captured image (e.g., captured using a prime lens or a zoom lens). A digital zoom may make a captured image seem more close up (e.g., magnify the captured image). Digital zoom may decrease an apparent field of view. Digital zoom may crop a portion of the captured image and interpolate the cropped result back up to a pixel dimension of the original captured image. No optical resolution may be as a result of digital zooming. However, digital zooming may deteriorate images above a certain zoom level (e.g., 2X) and zoom performance of a digital zooming system may be much worse than that of an optical zooming system.

A multi-lens digital zooming system may capture two or more images with differing fields of views for any given time point (e.g., using a zoom lens or a prime lens). A multi-lens digital zooming system may capture two or more images with differing fields of views in the same direction for any given time point. A multi-lens digital zooming system may comprise two or more optical modules (e.g., two or more lens modules and two or more corresponding sensors). The two or more images may then be fused using image processing algorithms to obtain a single image with a field of view equal to or smaller than that of the image having the largest field of view (between the two or more images with differing fields of views). However, it may be difficult to manufacture optical systems in which the optical axes of the two or more lens modules are parallel and the optical centers are close. In the two or more images captured images, the optical parallax may be different for different depths of objects which may bring computational difficulties for image alignment and give rise to ghosting problems.

The systems and methods described herein permit generation of two or more images. In some instances, imaging systems may be provided for generation of the images. The imaging systems may comprise two or more optical modules and an optical element. The two or more images may be captured with two or more optical modules that are not substantially parallel and/or having optical centers that are not close. The two or more optical modules may each capture images from a common line of sight. The two or more optical modules may each capture images from a line of sight that overlaps at least partially. The imaging system may lack an optical parallax (e.g., between the two or more optical modules). In some instances, a center of the two or more images may coincide. The two or more images may be combined. In some instances, it may not be necessary to estimate a depth of objects within the two or more images (e.g., there being no optical parallax) and accuracy of imaging matching may increase. While the imaging systems primarily comprise two optical modules, it is to be understood that the imaging systems may comprise two, three, four, five or more optical modules.

Figure 2:
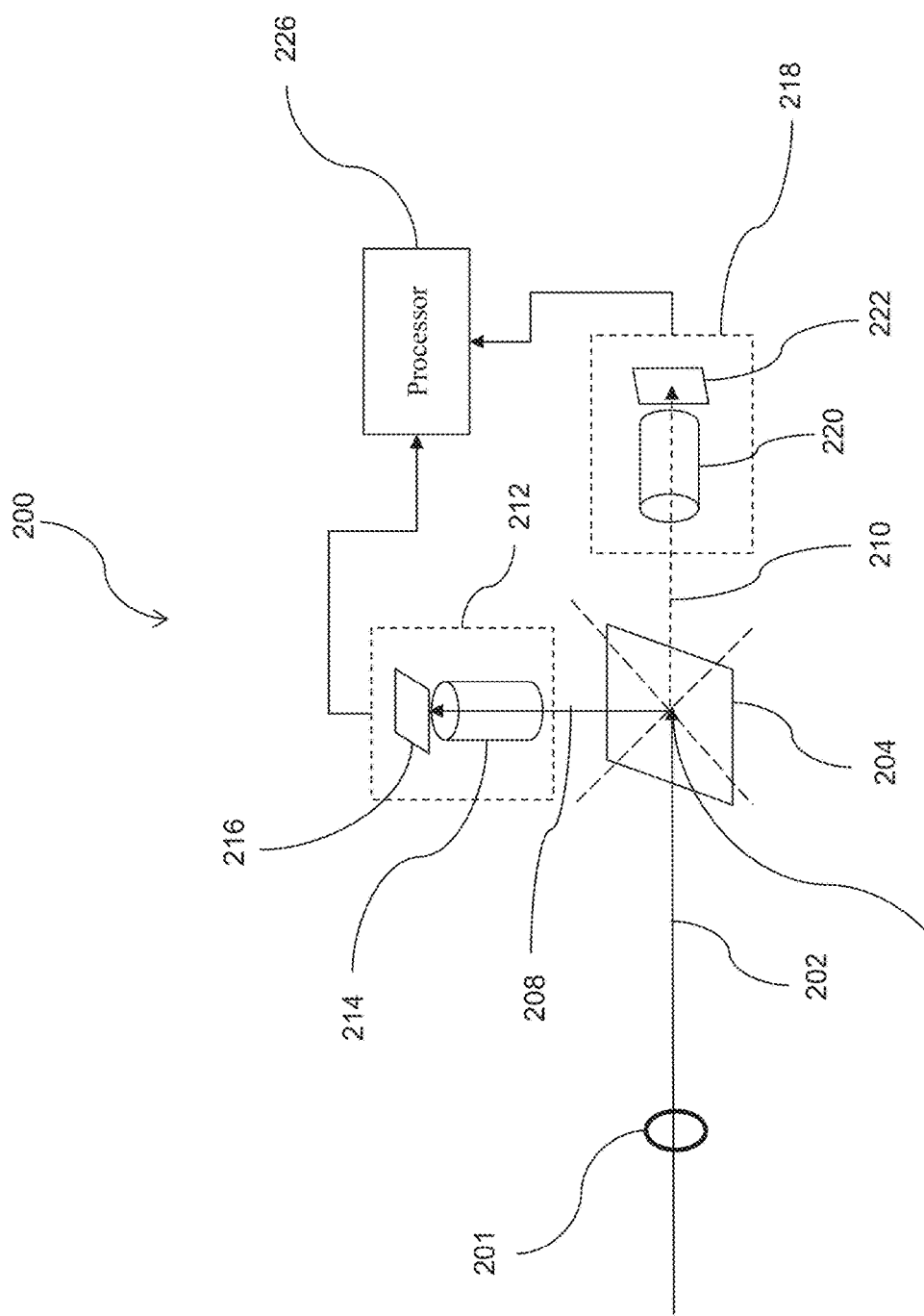
FIG. 2 illustrates an imaging system, in accordance with embodiments.

FIG. 2 illustrates an imaging system 200, in accordance with embodiments of the disclosure. The imaging system may be all enclosed in a single housing, as further described below. The imaging system may be, for example, a camera. The imaging system may comprise a plurality of discrete parts (e.g., devices) working together. For example, the imaging system may comprise two or more cameras and other optical elements working in conjunction.

Light may enter through a single aperture 201 on the imaging system. In some embodiments, light may enter through a plurality of apertures, such as two, three, four, five or more apertures. Light 202 entering through the aperture may come into contact with an optical element 204. The optical element may be a beamsplitter, such as a cube beamsplitter, plate beam splitter, pellicle beamsplitter, perforated beamsplitter, and the like. A beamsplitter may refer to an optical element or a device that splits a beam of light into two or more parts (e.g., two or more light beams). In some embodiments, the optical element may be a translucent film reflector, a prism, a translucent mirror, half-silvered mirror and the like. The optical element may be oriented such that light contacts the optical element at a certain incidence angle (e.g., measured from the normal of the optical element). In some embodiments, the incidence angle may be about 15°, 30°, 45°, or 60°, 90°, 120°, or 150°.

After contacting the optical element 204, the light may be separated into a first light beam 208 and a second light beam 210. The light may be from a single source. The light may be a single light beam. In some instances, a plurality of light beams may contact the optical element and each be separated into a first light beam and a second light beam. Each of the first and second light beams may comprise the same information (e.g., same light information, same photons, etc). Each of the first and second light beams may comprise substantially the same information. Each of the first and second light beams may contain different information. A same image may be captured from each of the first and second light beams. In some embodiments, the light may be separated into two, three, four, five or more light beams after contacting an optical element. The number of light beams may correspond to a number of optical modules in the imaging system. For example, if an optical element separates light into two light beams, the imaging system may comprise two optical modules. For example, if an optical element separates light into three light beams, the imaging system may comprise three optical modules.

In some embodiments, the optical element may both reflect and transmit (e.g., refract) light. For example, a first light beam 208 may be a reflected component of light 202 and a second light beam 210 may be a transmitted component of the light 202. The reflected light beam may be reflected at a certain reflectance angle (e.g., measured from the normal of the optical element). The reflectance angle may be about 15°, 30°, 45°, 60°, 90°, 120°, or 150°. The transmitted light beam may experience no refraction during transmission through the optical element and an optical path of light may not be affected where it is transmitted. In some embodiments, the transmitted light beam may experience refraction during transmission through the optical element and an optical path of light may be affected where it is transmitted. The transmitted light beam may be refracted at a certain refraction angle (e.g., measured from the normal of the optical element). The refraction angle may be about 15°, 30°, 45°, 60°, 90°, 120°, or 150°. In some embodiments, the transmitted light and the reflected light may be at about a 30°, 60°, 90°, 120°, 150°, or 180° angle relative to one another. In some embodiments, the transmitted light and the reflected light may be perpendicular (at a 90° angle) to each other. The optical element may have a transmission-to-reflectance (TR) ratio for light at a certain incidence angle (e.g., 45°). The TR ratio may measure the relative intensity of light of the transmitted light to reflected light. The TR ratio may be about 50/50, 40/60, 30/70, 20/80, 10/90, 90/10, 80/20, 70/30, 60/40. Alternative embodiments may include multiple reflected, multiple transmitted and/or refracted light beams. In some embodiments, a plurality of beam splitters may be utilized to further separate the light. Any description provided with respect to the optical element herein may apply in regards to multiple reflected, multiple transmitted and/or refracted light beams. In some embodiments, the optical element may separate light into beams of differing wavelength (color). For example the optical element may comprise dichroic or trichroic prisms which separate light into two or three colors.

A first light beam 208 may be directed and captured using a first optical module 212. A second light beam 210 may be directed and captured using a second optical module 218. Each optical module may each capture images of an environment (e.g., near or around the imaging system). Each optical module may continuously capture images. Each optical module may capture images at a specified frequency to produce a series of image data over time. Multiple modules of an imaging system may capture images at a high enough frequency to provide video-rate capturing. Images may be captured at a rate of at least 10 Hz, 20 Hz, 30 Hz, 40 Hz, 50 Hz, 60 Hz, 70 Hz, 80 Hz, 90 Hz, 100 Hz, 120 Hz, 150 Hz, 200 Hz, 250 Hz, or 300 Hz.

The first optical module 212 and second optical module 218 may each have an optical axis. An optical axis may refer to a line along which there is some degree of rotational symmetry in an optical module. The optical axis may be defined by a line along which light propagates through the lens module. The optical axis may pass through a center of the optical module. For example, line 208 may define an optical axis of the first optical module and line 210 may define an optical axis of the second optical module. The optical axis of the first optical module and an optical axis of the second optical module may intersect. For example, the optical axis of the first optical module and an optical axis of the second optical module may intersect with respect to an angular bisector of a reflection angle and a refraction angle (e.g., of the optical element). In some embodiments, the optical axes of the first optical module and the second optical module coincide exactly at a point 224 on the optical element 204. For example, the optical axes of the first optical module and the second optical module may intersect on a surface of the optical element. In some embodiments, the optical axis of the first optical module and an optical axis of the second optical module are perpendicular.

An optical module may each have a line of sight. A line of sight of an optical module may refer to a path of light coinciding with an optical axis of the optical module. For example, the first optical module 212 may have a line of sight comprised of section 208 and section 202. For example, the second optical module 218 may have a line of sight comprised of section 210 and section 202. A line of sight of the first optical module and the second optical module may overlap, for example over section 202. A line of sight of the first optical module and the second optical module may overlap at least partially (e.g., over section 202 but not afterwards).

Each optical module may comprise a lens module and a sensor (e.g., image sensor). For example, the first optical module 212 may comprise a first lens module 214 to direct the reflected light beam 208 to a first image sensor 216 that captures the reflected light beam (e.g., captures image data). For example, the second optical module 218 may comprise a second lens module 220 to direct the transmitted light beam 210 to a second image sensor 222 that captures the transmitted light beam. Each of the lens modules may comprise one or more lenses. The lens module may comprise a lens barrel configured to receive the one or more lenses. The lens barrel may house the one or more lenses. In some instances, the lens barrel may be used to adjust a focal length of the lens module by adjusting a distance between the one or more lenses. The lens may be configured to direct light to the image sensor. Optionally, other optical elements, such as mirrors, filters, gratings, additional lenses, or dichroics, may be provided that may aid in directing light to the image sensor. Alternatively, no lens or optical elements may be provided.

Each lens (e.g., or lens module, or optical module) may have a corresponding focal length or a focal length range. A focal length range may include multiple focal lengths falling within a lower limit and an upper limit of the range. In some instances, a focal length range may include a single focal length. The single focal length may serve as both the lower limit and the upper limit of the range. As used herein, it is to be understood that focal length and focal length range may be used interchangeably. A focal length of a lens may measure how strongly the lens converges or diverges light. The focal length of an optical lens may refer to the distance over which initially collimated rays are brought to a focus. A lens may be a prime lens or a zoom lens. A prime lens may have a fixed, single focal length. A prime lens may refer to a stationary lens that does not move. A zoom lens may have variable focal lengths and the focal length may encompass a plurality of focal lengths (e.g., focal length range). An optical zoom lens may vary the focal length by a relative movement of a set of internal lens elements. In some embodiments, the imaging system may comprise only prime lenses. For example, optical module 212 and optical module 218 may comprise only prime lenses. In some embodiments, the imaging system may comprise both a prime lens and a zoom lens. For example, one optical module may comprise a prime lens while another optical module comprises a zoom lens. In some embodiments, the imaging system may comprise only zoom lenses.

The focal length of each optical module of the imaging system may be different. For instance, each optical module of the imaging system may comprise prime lenses having different focal lengths. For example, the first optical module 212 may have a first focal length that is different from a second focal length of the second optical module 218. For example, optical module 212 may have a first focal length based on a first prime lens, and optical module 218 may have a second focal length based on a second prime lens. The first optical module may have a focal length that is greater than 25%, 50%, 75%, 100%, 125%, 150%, 200%, 300%, 400%, 500%, or 1000% of the second optical module. The first optical module may have a focal length that is less than 25%, 50%, 75%, 100%, 125%, 150%, 200%, 300%, 400%, 500%, or 1000% of the second optical module. Additionally, there may be a third optical module (e.g., or fourth, fifth, sixth, etc) having a focal length different from the first focal length range and/or the second focal length range, and so forth. In some embodiments, the focal length of each optical module of the imaging system may be the same. For example, optical module 212 may have a focal length that is the same as focal length of optical module 218.

In some instances, a focal length of a prime lens may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. Optionally, the focal length of a prime lens suitable may be greater than or equal to any of the values described herein. The focal length of a prime lens may have a value falling within a range between any two of the values described herein.

Each optical module of the imaging system may comprise an image sensor. Image sensor as used herein may also be referred to as a sensor. The light focused by the lens may be directed onto the image sensor of the optical module. The image sensor may be at a predetermined distance away from the lens module. For example, the distance from the image sensor to the lens module may correspond to the focal length of the lens module. In some instances, the image sensor may have a variable distance to the lens module (e.g., zoom lens). The image sensor may be positioned such that a focal plane of the captured image is coplanar with the image sensor plane.

The image sensor may refer to a device that converts optical information (e.g., light striking the sensor surface may comprise optical information) into digital information (e.g., electronic signals). Converting optical information into digital information may herein be referred to as capturing an image (e.g., image data). An image sensor may detect and convey information that constitutes an image. The image sensors may be of a charge-coupled devices (CCD) type, a complementary metal-oxide-semiconductor (CMOS) type, an N-type metal-oxide-semiconductor (NMOS) type, or a back-side illuminated CMOS (BSI-CMOS) type. Each optical module of an imaging system may have the same type of image sensor, or different types of image sensors. The image sensors may have the same characteristics or may have different characteristics. For example, the image sensors may be capable of capturing an image of the same resolution, or may have different resolutions at which images can be captured. For instance, one of the image sensors may permit a resolution of 25%, 50%, 75%, 100%, 125%, 150%, 200%, 300%, 400%, 500%, or 1000% of other image sensors. Each image sensor may have a sensor size. The sensor size (e.g., physical size) of the two or more image sensors (e.g., in the imaging system) may be the same. For example, first sensor 216 and second sensor 222 may have the same size. In some embodiments, the sensor size of the two or more image sensors (e.g., in the imaging system) may be different. For example, a sensor size of a given image sensor may be 25%, 50%, 75%, 100%, 125%, 150%, 200%, 300%, 400%, 500%, or 1000% in size of any other image sensor (e.g., in the imaging system). Each image sensor may have a set number of pixels. For example the image sensor may have about 1, 2, 3, 4, 5, 6, 8, 10, 12, 14, 16, 18, 20, 25, 30, 35, 40, 50, 60, 70, 80, 90, or 100 megapixels. Each image sensor in the imaging system may have the same number of pixels. For example, first sensor 216 and second sensor 222 may each have the same number of pixels. In some embodiments, the number of pixels of the two or more image sensors (e.g., in the imaging system) may be different. For example, a pixel number of a given image sensor may be 25%, 50%, 75%, 100%, 125%, 150%, 200%, 300%, 400%, 500%, or 1000% of any other image sensor (e.g., in the imaging system). Each pixel for a given image sensor may have a pixel size. Each image sensor in the imaging system may have the pixels of the same size. For example, first sensor 216 and second sensor 222 may each have pixels of the same size. In some embodiments, a pixel size of the two or more image sensors (e.g., in the imaging system) may be different. For example, a pixel size of a given image sensor may be 25%, 50%, 75%, 100%, 125%, 150%, 200%, 300%, 400%, 500%, or 1000% in size of any other image sensor's pixel size (e.g., in the imaging system). The number of pixels in an image sensor may determine a physical size of a generated image. The image sensors may use the same amount of processing power, or may use different amounts of processing power. The image sensors of the different optical modules may consume the same amount of power or may consume different amounts of power.

Figure 3:
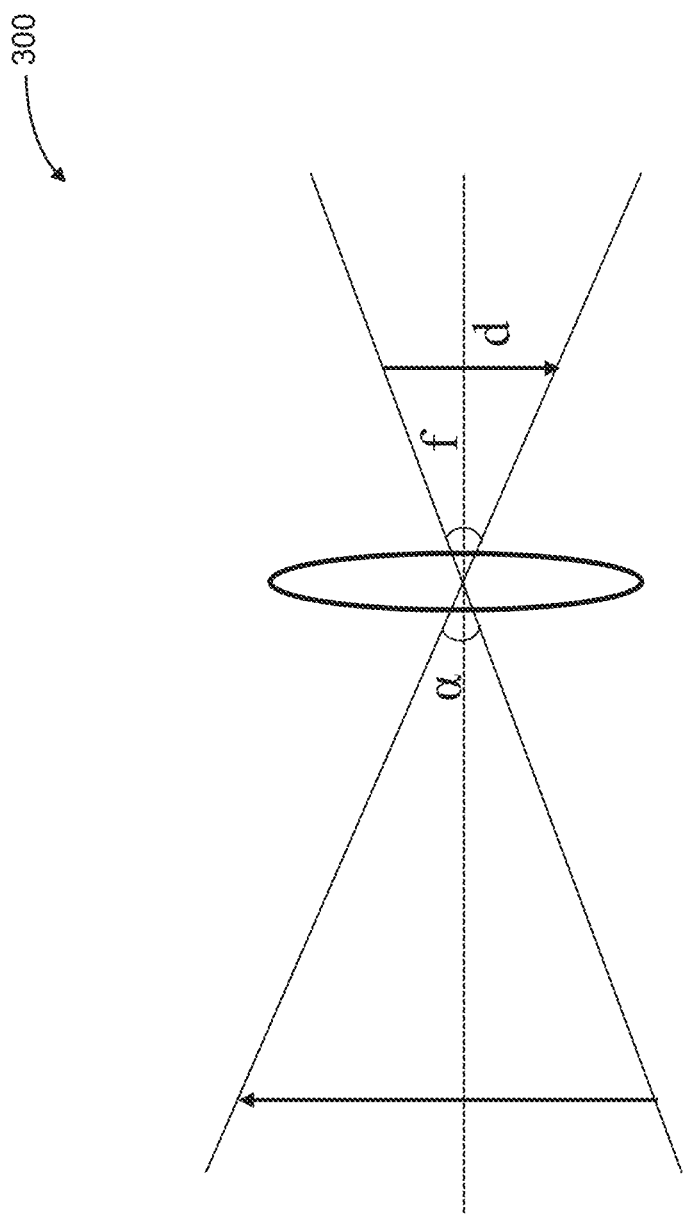
FIG. 3 illustrates a field of view angle of an optical lens, in accordance with embodiments.

Each optical module may have a field of view (FOV) associated with it. Each optical module in the imaging system may have a different FOV. Each optical module in the imaging system may have identical (e.g., same) fields of views. The fields of views of the optical modules in the imaging system may overlap. A FOV of an optical module may encompass a FOV of a different optical module in the imaging system. A FOV may refer to a part of the world that is visible on an imaging system at a particular position and orientation in space. Objects outside the FOV when an image is taken may not be recorded in a photograph. FOV may also be expressed as an angular size of the view cone, or as an angle of view. A FOV of an optical module may depend on the sensor size and the focal length. FIG. 3 illustrates field of view angle of an optical lens 300, in accordance with embodiments of the disclosure. For the optical lens, the field of view angle α can be calculated as FOV $\alpha = 2 \arctan(d/2f)$, where d is image sensor size, and f is focal length of the lens.

For an image sensor having a fixed size, a prime lens (e.g., lens module, optical module) may have a fixed FOV and the FOV may encompass a single FOV angle. For an image sensor having a fixed size, a zoom lens (e.g., lens module, optical module) may have variable FOV angular range and the FOV angular range may encompass a plurality of FOV angles. The FOV of the first optical module 212 may be different from the FOV of the second optical module 218. The FOV may depend on one or more lenses or other optical elements (e.g., sensor) of the optical modules. For example, the difference in FOV between the first optical module and the second optical module may be due to differences in a first lens module 214 and a second lens module 220. For example, the difference in FOV between the first optical module and the second optical module may be due to differences in the first sensor 216 and the second sensor 222. For example, the difference in FOV between the first optical module and the second optical module may be due to differences between the first lens module and the second lens module as well as differences between the first sensor and the second sensor. In some instances, a FOV of a prime lens may (e.g., lens module, optical module) be less than or equal to 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or 15°. Optionally, the FOV of a prime lens (e.g., lens module, optical module) may be greater than or equal to any of the values described herein. The FOV of a prime lens may have a value falling within a range between any two of the values described herein.

The first optical module and the second optical module may be configured to capture images from the same direction. In some embodiments, optical axes of the first optical module and the second optical module may coincide or intersect, for example, at a point 224. In some embodiments, optical axes of the first optical module and the second optical module may be perpendicular. In some embodiments, optical axes of the first optical module and the second optical module may diverge by at most about 30 degrees, 45 degrees, 60 degrees, 75 degrees, 90 degrees, 120 degrees, or 150 degrees. In some embodiments, optical axes of the first optical module and the second optical module may diverge by at least about 30 degrees, 45 degrees, 60 degrees, 75 degrees, 90 degrees, 120 degrees, or 150 degrees. In some embodiments, optical axes of the first optical module and the second optical module may diverge in between about 30 degrees, 45 degrees, 60 degrees, 75 degrees, 90 degrees, 120 degrees, or 150 degrees. There may be no optical parallax between an image captured by the first optical module and the second optical module. For example, there may be no optical parallax because the first optical module and the second optical module may each capture images from a common line of sight (e.g., from a line of sight that overlaps at least partially). A center of an image captured by the first optical module and the second optical module may coincide (e.g., coincide exactly). A FOV of an image captured by the first optical module and the second optical module may overlap. The image captured by the first optical module and the second optical module may be images captured from the same direction and/or same angle. The image captured by the first optical module and the second optical module may be images captured from the same originating light (e.g., light beams).

An image processor 226 may be provided to receive image data from the first optical module 212 and/or the second optical module 218 and generate data to display at least one image captured using the first optical module and/or the second optical module. In some embodiments, the image processor may combine the image captured from the first optical module and the second optical module to generate a combined image. In some embodiments, the image processor may be provided onboard a movable object, such as a UAV or a mobile phone. In some embodiments, the image processor may be provided on board an imaging system (e.g., camera) of the movable object. The image processor may be within or outside a housing of the imaging system. In some instances, the image processor may be provided off-board the imaging system of the movable object. The image processor may be provided on a carrier, such as a gimbal, further described below. Alternatively, the image processor may be provided remote to the movable object. For instance, the image processor may be provided on a remote controller (e.g., cell phone, PDA, etc), server, ground station (e.g., desktop computer, laptop, charging station, etc), or cloud-based infrastructure. Information from one or more optical modules may be wirelessly transmitted to the image processor. Alternatively, information from the optical modules may be provided to the image processor via a physical connection. The image processor 226 may be implemented by a Central Processing Unit (CPU), Application Specific Integrated Circuit (ASIC), or Field Programmable Gate Array (FPGA). Any description herein of a processor may apply to one or more processors, which may individually or collectively perform any functions described for the image processor. The image processor may include a single or multiple processors. The image processor may be capable of executing one or more steps in accordance with non-transitory computer readable media comprising code, logic, or instructions for performing one or more steps. Memory storage units may be provided which may comprise the non-transitory computer readable media.

In some instances, the image processor may receive a desired FOV (e.g., a desired focal length, a desired magnification, a desired zoom, a desired direction, etc). The desired FOV may be received, for example, from a user. For instance, an instruction of a desired FOV may be received from the user through a remote terminal. The user may select a desired FOV and send the instruction of a FOV by operating buttons provided on the remote terminal or by touching soft buttons displayed on a screen of the remote terminal. In some instances, a user may observe a display showing an environment that is to be captured by the imaging system (e.g., in real time). The user may increase or decrease the FOV (e.g., focal length, zoom ratio, etc) of the environment in the display (e.g., via touchscreen interface, physical buttons, etc) that is to be captured by the imaging system. Once a user confirms the FOV that is to be captured by the imaging system (e.g., by pushing the display screen or a button), the desired FOV may be received by the image processor. In some embodiments, the image processor may be configured to receive image data from the first optical module and the second optical module and store the image data in corresponding buffers. In some instances, the image data may be read from the corresponding buffers and processed according to an external instruction of a desired FOV. In some instances, the desired FOV may be a required input before any image capture by the imaging system. In some instances, the desired FOV may be input subsequently to image capture by the imaging system, or may be updated at any time during image capture by the imaging system.

In some instances, the desired FOV may be determined by one or more processors. In some instances, the one or more processors may determine the desired FOV (e.g., by analyzing the image of the environment to be captured). The one or more processors may determine the desired FOV automatically without any human input. In some instances, the one or more processors may determine the desired FOV semi-automatically, for example, according to a set criterion pre-input by a user. In some instances, the one or more processors may determine or control external factors to affect the FOV of the images to be captured. For example, the one or more processors may affect a direction or orientation of a carrier (e.g., gimbal) or movable object (e.g., UAV) coupled with the imaging system. In some instances, the desired FOV may equal the wider FOV between the FOV of the first optical module and the second optical module.

Based on the desired FOV, the image processor may combine the image data received from optical module 212 and optical module 218, as further described herein. In some instances, combining the image data (e.g., received from two or more optical modules) may comprise scaling and/or fusing the image data. Scaling images (e.g., image data) may be used herein to refer to increasing or decreasing a size of the images (e.g., magnifying the image, scaling each pixel in an image by a factor). Fusing two or more images (image data) may be used herein to refer to combining parts of two or more images to generate a single image (e.g., with a better image quality than either of the individual images). The single image that is generated (e.g., fused) may be seamlessly integrated (e.g., at the borders).

Images captured by optical module 212, optical module 218, or the combined image may be shown on a display. The images may be shown on the display in real time. The display may be a device appropriate for displaying images or videos, for example, a LCD (Liquid Crystal Display), a CRT (Cathode Ray Tube), an OLED (Organic Light Emitting Diodes), or a Plasma. The display may be configured to show the images captured by the first optical module 212 and/or the second optical module 218. The display may be configured to show a combined image generated by the processor 226. The display may display the image based on the image data generated by the image processor. In some embodiments, the display may be a local display device of the imaging system 200. In some instances, the display may be provided on a movable object or the stationary object carrying the imaging system. In some instances, the display may be provided on a mobile device, such as a cellphone, PDA, tablet, or controller. Alternatively, the display may be a display device remote to the imaging system 200. In some instances, the display may be a remote terminal such as a smartphone, a tablet, a laptop or a personal computer, which receives the image data from the imaging system via a wireless link. The wireless link between the imaging system and the display may be a RF (radio frequency) link, a Wi-Fi link, a Bluetooth link, a 3G link, or a LTE link.

The display may also function as an input device for receiving a user's instruction with regard to the images (e.g., to be captured and or generated). In some instance, the display may be an interactive screen, by which the user may select a desired focal length, desired magnification, desired field of view, etc of the environment to be shown on the display. The display may be a touchscreen. Alternatively, the user may interact with the display using any user interactive device, such as a mouse, keyboard, joystick, trackball, touchpad, or microphone.

An imaging system may have a housing. Multiple optical modules of the imaging system may be provided within a single housing. Alternatively, different optical modules may be provided in different housings. In one example, a first optical module and a second optical module may be provided in one housing and thus share the housing. Alternatively, the first optical module and second optical module may be provided in different housings. A housing may encapsulate one, two or more optical modules. In some embodiments, a housing may be substantially fluid-tight. The housing may be air-tight. The housing may be formed from a substantially opaque material, translucent material, or transparent material. The housing may prevent unwanted light from entering the housing. The housing may limit light reaching the optical modules to one or more controlled entrances. The housing may be light-tight, except for a single aperture located on the housing. In some embodiments, multiple optical modules of an imaging system may be supported by a single housing. The optical modules may be within the housing, on an exterior of a housing, or at least partially embedded in a housing. The housing may cause the optical modules to move together. For instance, the optical modules may be movable as a single unit. The optical modules may rotate together about one or more axes, or may translate together along one or axes. In some instances, the optical modules may be movable relative to one another within the housing. For example, each individual optical element may be able to translate relative to another along one or more axes within the housing or may be able to rotate relative to one another.

Figure 4:
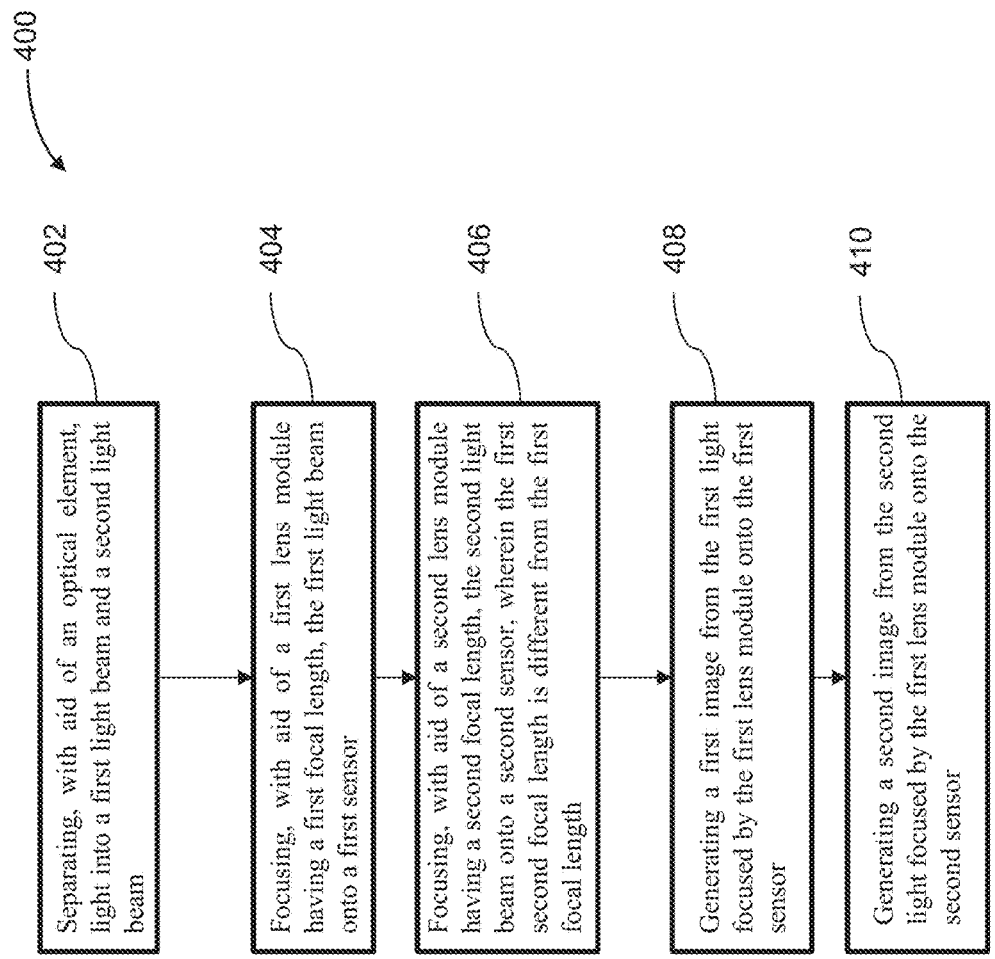
FIG. 4 illustrates a method for generating images, in accordance with embodiments.

FIG. 4 illustrates a method for generating images, in accordance with embodiments. In step 402, light is separated into a first light beam and a second light beam with aid of an optical element. The light may be from a single source. The light may be a single light beam. In some instances, a plurality of light beams may contact the optical element and each be separated into a first light beam and a second light beam. In some instances, the light (e.g., a plurality of light beams) may enter through a single aperture, as previously described herein. The optical element may be substantially as described herein (e.g., a beam splitter, a translucent film reflector, a prism, a translucent mirror, half-silvered mirror and the like). The first light beam may be a reflected component of the light and the second light beam may be a transmitted component of the light. In some embodiments, the first light beam may be a transmitted component of the light and the second light beam may be a reflected component of the light.

In step 404, the first light beam is focused with aid of a first lens module. The first light beam may be directed to (e.g., focused onto) a first sensor with aid of the first lens module. The first lens module may comprise at least one lens. In some embodiments, the first lens module comprises a lens barrel configured to receive the at least one lens. In some embodiments, the first lens module comprises only prime lenses. In some embodiments, the first lens module may have a first focal length. The first focal length may be focal length may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. In some embodiments, the first lens module comprises a telescope lens module. A telescope lens module may have a focal length that is substantially larger than a focal length of a normal lens for a given film plane. For example, a telescope lens module may have a focal length that is about or greater than 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. In some embodiments, the telescope lens module may direct and/or focus a reflected component of the light.

In step 406, the second light beam is focused with aid of a second lens module. The second light beam may be directed to (e.g., focused onto) a second sensor with aid of the second lens module. The second lens module may comprise at least one lens. In some embodiments, the second lens module comprises a lens barrel configured to receive the at least one lens. In some embodiments, the second lens module comprises only prime lenses. In some embodiments, the second lens module may have a second focal length. The second focal length may be different from the first focal length. For example, the second focal length may be less than the first focal length. The second focal length may be greater than the focal length. The second focal length may be focal length may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm.

In some embodiments, the second lens module comprises a wide-angled lens module. A wide-angled lens module may have a focal length that is substantially smaller than a focal length of a normal lens for a given film plane. For example, a wide-angled lens module may have a focal length that is about or less than 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm. In some embodiments, the wide-angled lens module may direct and/or focus a transmitted component of the light (e.g., light that is transmitted through the optical element).

The optical axis of the first lens module and an optical axis of the second lens module may intersect. For example, the optical axis of the first lens module and an optical axis of the second lens module may intersect with respect to an angular bisector of a reflection angle and a refraction angle (e.g., of the optical element). In some embodiments, the optical axes of the first lens module and the second lens module coincide exactly at a point on the optical element. For example, the optical axes of the first lens module and the second lens module may intersect on a surface of the optical element. In some embodiments, the optical axis of the first lens module and an optical axis of the second lens module are perpendicular.

In step 408, a first image (e.g., image data) is captured from the first light beam focused onto the first sensor. The first sensor may aid in capturing the first image, as previously described herein (e.g., by converting optical information into digital information). The first sensor may be a CMOS sensor, CCD sensor, NMOS sensor, BSI-CMOS sensor as previously described herein. The first sensor may have certain characteristics associated with it. For example, the first sensor may have a predetermined size, pixel size, number of pixels, etc as previously described herein. The first image may have a first field of view. In some instances, the first field of view may be less than or equal to 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or 15°.

In step 410, a second image (e.g., image data) is captured from the second light beam focused onto the second sensor. The second sensor may aid in capturing the second image, as previously described herein (e.g., by converting optical information into digital information). The second sensor may be a CMOS sensor, CCD sensor, NMOS sensor, BSI-CMOS sensor as previously described herein. In some instances, both the first sensor and the second sensor may be a CMOS sensor. The second sensor may have certain characteristics associated with it. For example, the second sensor may have a predetermined size, pixel size, number of pixels, etc as previously described herein. The second sensor may have the same characteristics as the first sensor. For example, the first sensor and the second sensor may have identical sizes (e.g., physical size), the same number of pixels, and/or the size of each pixel on the first sensor and the second sensor may be identical. The second image may have a second field of view. In some instances, the second field of view may be less than or equal to 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or 15°. The second field of view may be different from the first field of view. For example, the second field of view may be about 25%, 50%, 75%, 100%, 125%, 150%, 200%, 300%, 400%, 500%, or 1000% of the first field of view. In some instances, the second field of view may be of a FOV that is wider than the first field of view. The second image may have a center that coincides with the first image. The second image may have an image size that is the same as the first image (e.g., the number of pixels of the first sensor and the second sensor are identical). In some embodiments, the second image may be encompassed by the first image in terms of FOV. There may be no parallax between the first image and the second image. For example, there may be no displacement or difference in the apparent position of objects within the first image and the second image.

Method 400 may further comprise combining, with aid of one or more processors, the first image and the second image. Combining the first image and the second image may comprise scaling the first image by $$\frac{\text{the desired focal length}}{\text{the first focal length}}$$

and the second image by $$\frac{\text{the desired focal length}}{\text{the second focal length}}.$$

Scaling the first image and/or the second image may utilize a cubic interpolation algorithm or a bilinear interpolation algorithm. A scaled image may have a desired magnification (e.g., desired zoom). For example, the first scaled image and the second scaled image may have the same relative magnification. For example, the relative size of objects within the first scaled image and the second scaled image may be the same.

Combining the first image and the second image may comprise fusing the scaled first image and the scaled second image. For example, the scaled first image and the scaled second image may be fused in areas in which a field of view of the first scaled image and the second scaled image overlaps. Portions of the scaled second image may be utilized for areas in which a field of view of the first scaled image and the second scaled image do not overlap if necessary, as described further below. For example, the scaled first image and the scaled second image may be aligned (e.g., at the center). The scaled second image may encompass the scaled first image. The aligned scaled first image and the scaled second image may comprise an overlapping region and a non-overlapping region. For example, the entirety of the scaled first image and an inner portion of the scaled second image may comprise the overlapping region. An outer portion of the scaled second image may comprise the non-overlapping region. The scaled first image and the scaled second image may be fused using a Laplacian pyramid algorithm or a weighted average algorithm. In some embodiments, fusing the scaled first image and the scaled second image may comprise pixel fusion. For example, pixel fusion may occur for areas in which a field of view of the first scaled image and the second scaled image overlaps. A fused image may have a better quality image in the overlapping region compared to the scaled first image or the scaled second image. A better quality image as used herein may refer to an image having a higher resolution or more information than another image.

Figure 5:
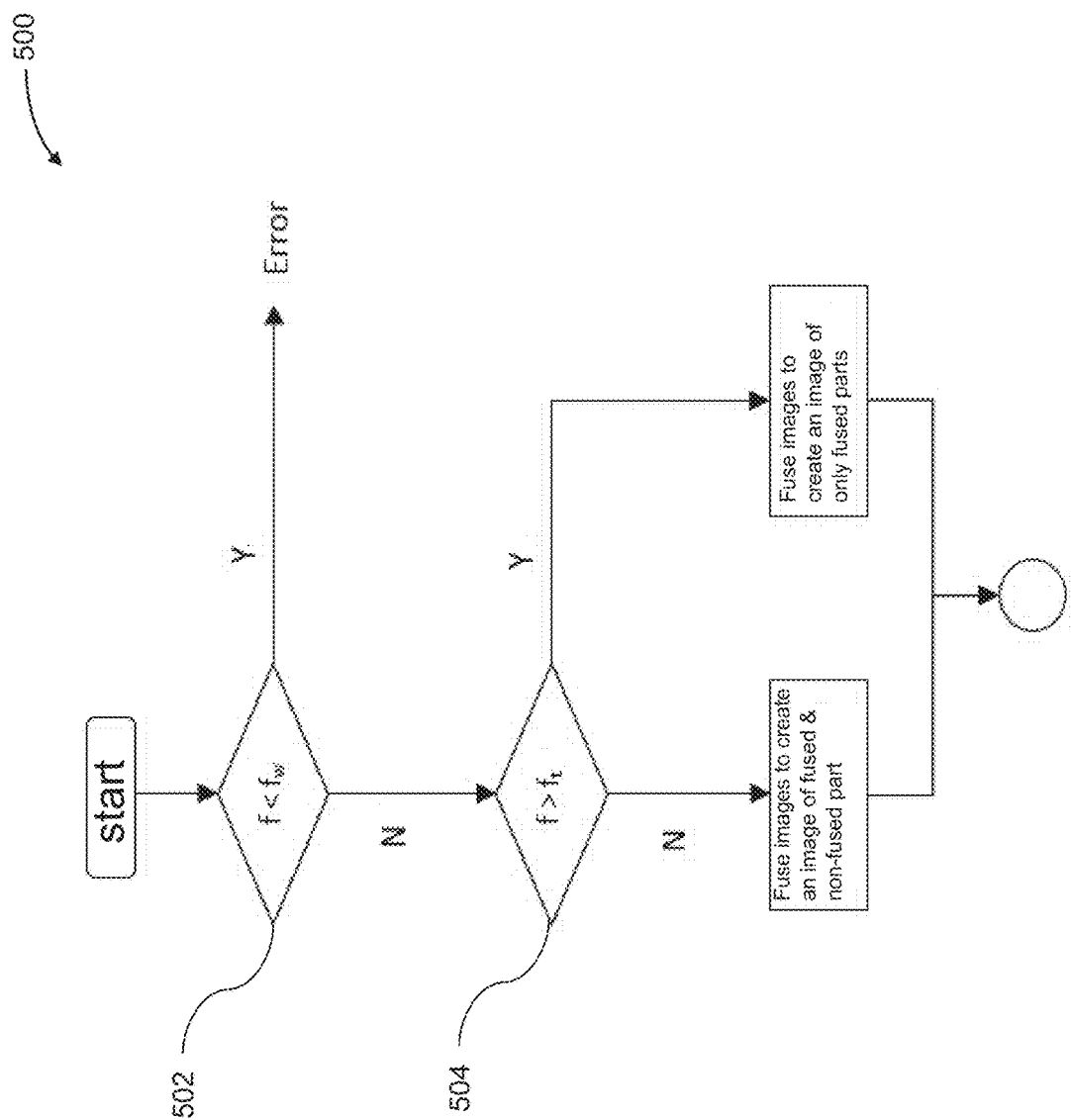
FIG. 5 illustrates a flowchart for obtaining a combined image having a desired magnification, in accordance with embodiments.

FIG. 5 illustrates a flowchart 500 for obtaining a combined image having a desired magnification, in accordance with embodiments. Flowchart 500 may be used, for example in combining the first image and the second image as described in relation to step 410. In some embodiments, a desired focal length may be received at the one or more processors. The desired focal length may correspond to a desired field of view, a desired magnification, a desired zoom, and the like. For example, the desired focal length may be input by a user or determined automatically or semi-automatically as previously described herein. The desired focal length may be equal to or greater than at least one of the first focal length or the second focal length. If the desired focal length is greater than both the first focal length and the second focal length, the corresponding desired field of view may be narrower than both the first field of view (e.g., FOV of the first image) and the second field of view (e.g., FOV of the second image). If the desired focal length is between the first focal length and the second focal length, the corresponding desired field of view may be between the first field of view and the second field of view. If the desired focal length is between the first focal length and the second focal length, the corresponding desired field of view may be wider than the first field of view (e.g., corresponding to an image acquired with a telescope optical lens module) but narrower than the second field of view (e.g., corresponding to an image acquired with a wide-angled lens module).

In step 502, the desired focal length f is compared to the focal length fw of the wide-angled lens module (e.g., the lens module having the shorter focal length). The desired focal length f may be limited to only allow inputs that are equal to or greater than at least one of the first focal length or the second focal length (e.g., fw and ft). If a focal length shorter than the focal length of the wide-angled lens module fw is selected, an error message may be output (e.g., on a display) to inform the user.

In step 504, a determination is made whether the desired focal length f is greater than the focal length ft of the telescope lens module (e.g., lens module having the greater focal length). If the desired focal length f is greater than the focal length ft of the telescope lens module, only the image generated by the optical module having the greater focal length (e.g., telescope lens module) may be utilized in generating a desired image (e.g., image having the desired focal length). For example, the first image generated by telescope lens module may be scaled by $$\frac{\text{the desired focal length}}{\text{the first focal length}}$$

and cropped to simulate the image having the desired focal length (e.g., digital zoom). In some embodiments, if the desired focal length is greater than the focal length of the telescope lens module, the scaled first image and the scaled second image may be fused to generate an image as previously described herein (e.g., seamlessly fused). The fused image may be cropped such that the FOV of the combined image is comprised wholly of the fused parts (e.g., pixel fused parts). If the desired focal length is smaller than the focal length of the telescope lens module, the scaled first image and the scaled second image may be fused to generate a combined image as previously described herein. The fused image may be cropped such that the FOV of the combined image is comprised of an inner FOV comprised of the fused parts (e.g., pixel fused parts) and an outer FOV comprised of the scaled second image (e.g., image with the larger FOV). The combined image may have a field of view corresponding to the desired focal length.

Figure 6:
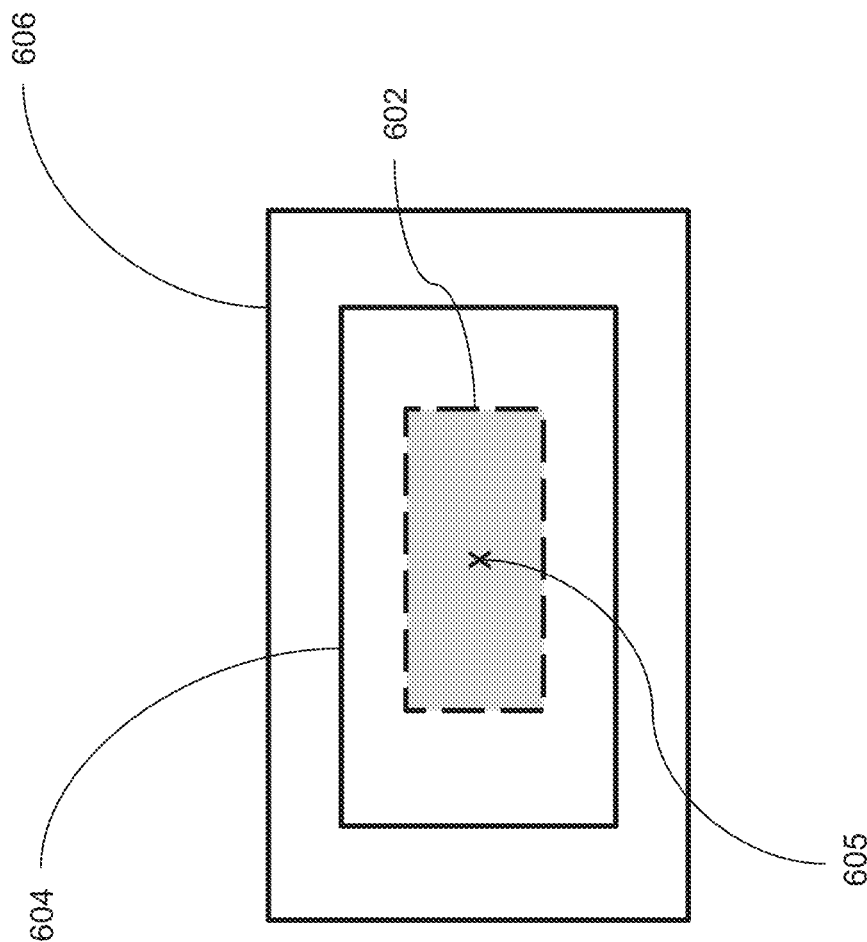
FIG. 6 illustrates an image having a desired FOV less than the first FOV and the second FOV, in accordance with embodiments.

FIG. 6 illustrates an image having a desired FOV greater than the first and second focal lengths, in accordance with embodiments. A desired focal length may be received at one or more processors. In some instances, a first image may be acquired using a first lens module and a first sensor and a second image may be acquired using a second lens module and a second sensor. In some instances, the first lens module may be a telescope lens module and the second lens module may be a wide-angled lens module. In some embodiments, the first sensor and the second sensor may be of the same type (e.g., CMOS sensor) and may have identical characteristics, such as the same sensor size, have the same number of pixels, and/or have the same pixel size. The first image may be scaled by $$\frac{\text{the desired focal length}}{\text{the first focal length}}$$

and the second image may be scaled by $$\frac{\text{the desired focal length}}{\text{the second focal length}}$$

as previously described herein.

The desired focal length may be greater than a focal length of the first lens module (e.g., telescope lens module). For example, image 602 may represent an image having a desired focal length (e.g., an image having a desired field of view, image having a desired magnification, etc). The field of view of an image having a focal length greater than the focal length of the first lens module may have a field of view narrower than either the first field of view or the second field of view. Image 604 may represent a scaled first image and image 606 may represent a scaled second image. When aligned, the scaled first image and the scaled second image may have a common center 605. When aligned, the scaled first image and the scaled second image may have an overlapping portion defined by the field of view of the scaled first image. Image 602 may be generated by fusing image 604 and image 606. The fused image may be seamlessly integrated. The fused image may be cropped to generate the image 602 having a desired focal length. The image 602 having a desired focal length may comprise only of fused parts (e.g., pixel fused parts from the overlap portion of the scaled first image and the scaled second image).

Figure 7:
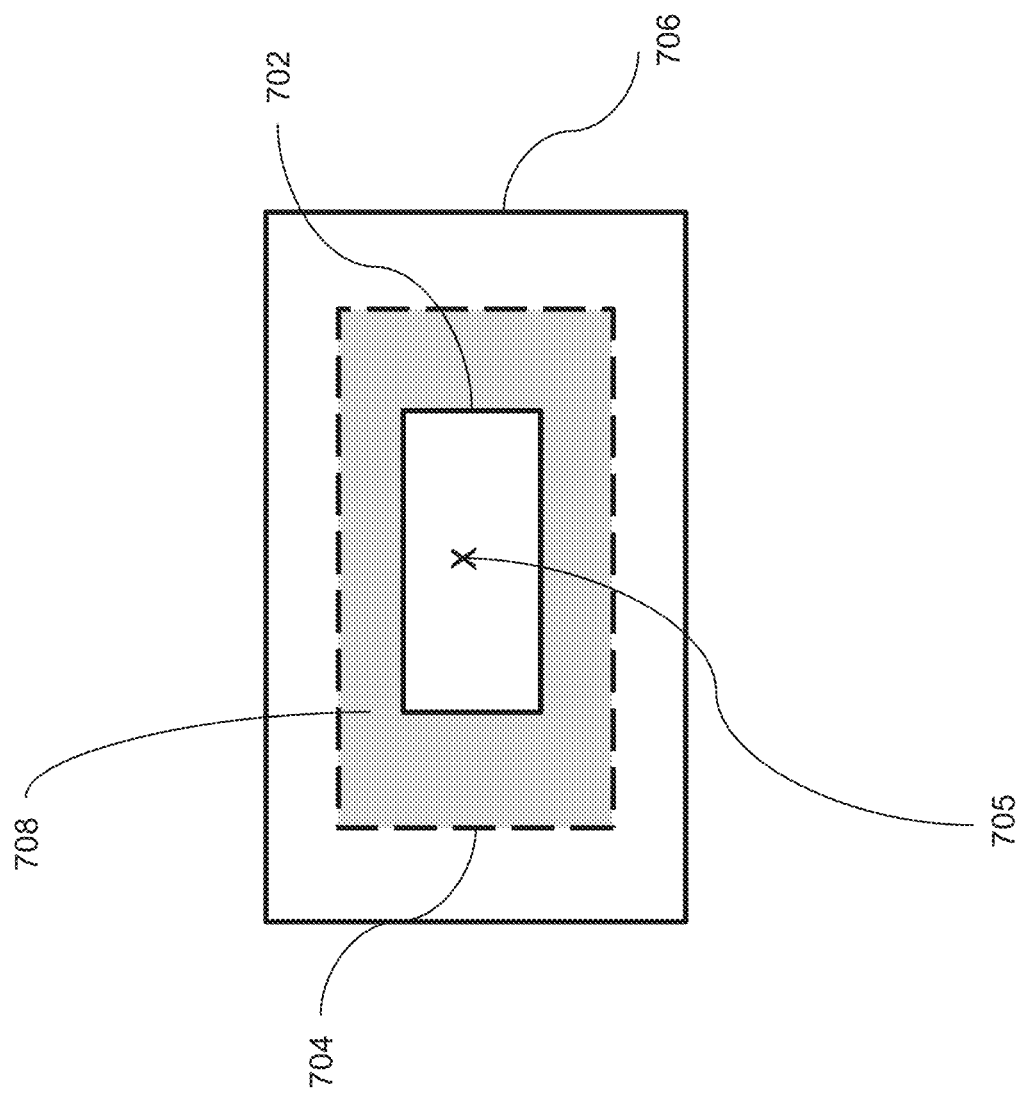
FIG. 7 illustrates an image having a desired FOV between the first FOV and the second FOV, in accordance with embodiments.

FIG. 7 illustrates an image having a desired FOV between the first and second focal lengths, in accordance with embodiments. The desired focal length may be greater than a focal length of the second lens module (e.g., wide-angled lens) but less than a focal length of the first lens module (e.g., telescope lens module). For example, image 704 may represent an image having a desired focal length (e.g., an image having a desired field of view, image having a desired magnification, etc). The field of view of an image having a focal length between the focal length of the first lens module and the focal length of the second lens module may have a field of view narrower than the second field of view but wider than the first field of view. Image 702 may represent a scaled first image and image 706 may represent a scaled second image. When aligned, the scaled first image and the scaled second image may have a common center 705. When aligned, the scaled first image and the scaled second image may have an overlapping portion defined by the field of view of the scaled first image. Image 704 may be generated by fusing image 702 and image 706. The fused image may be seamlessly integrated. The fused image may be cropped to generate the image 704 having a desired focal length. The image 704 having a desired focal length may comprise an inner FOV (e.g., inner portion) comprised of the fused parts (e.g., pixel fused parts) and an outer FOV (e.g., outer portion) comprised of the scaled second image (e.g., image with the larger FOV).

Figure 8:
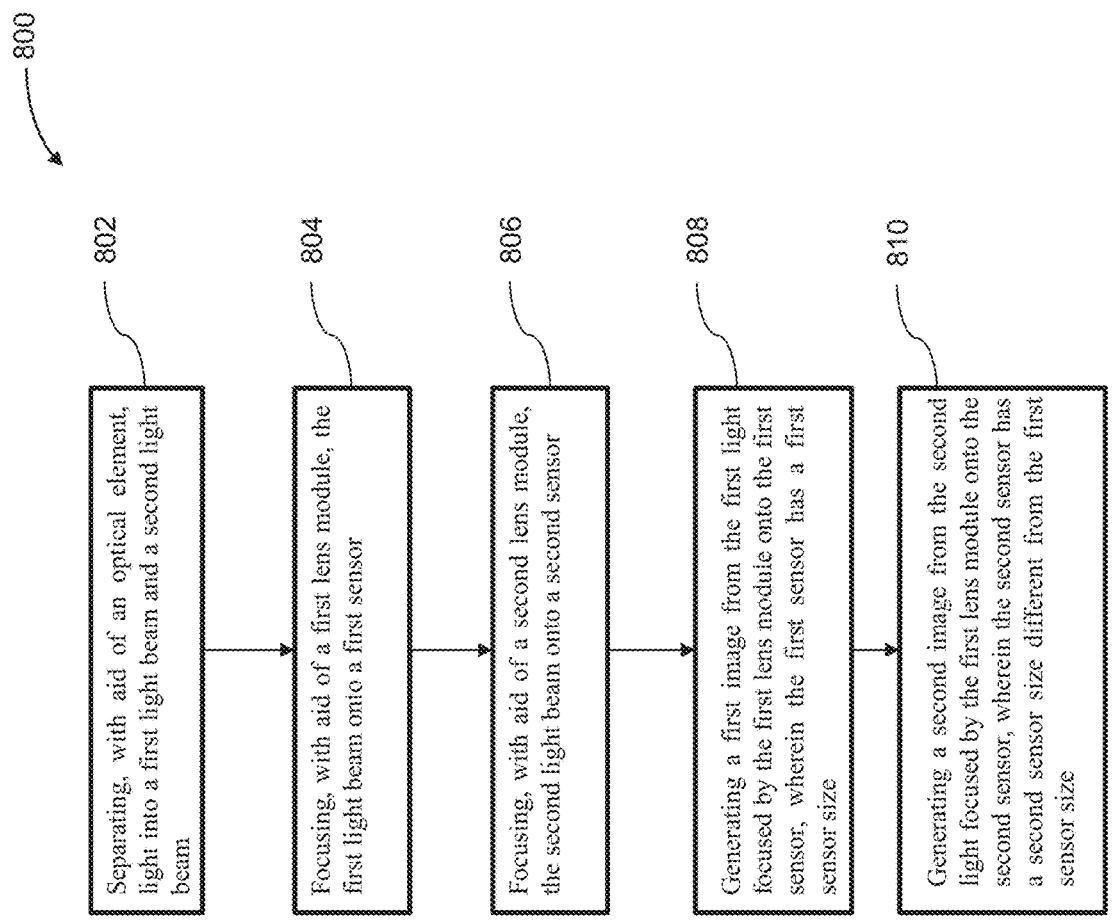
FIG. 8 illustrates a method for generating images, in accordance with embodiments.

FIG. 8 illustrates a method for generating images, in accordance with embodiments. In step 802, light is separated into a first light beam and a second light beam with aid of an optical element. The light may be from a single source. The light may be a single light beam. In some instances, a plurality of light beams may contact the optical element and each be separated into a first light beam and a second light beam. In some instances, the light (e.g., a plurality of light beams) may enter through a single aperture, as previously described herein. The optical element may be substantially as described herein (e.g., a beam splitter, a translucent film reflector, a prism, a translucent mirror, half-silvered mirror and the like). The first light beam may be a reflected component of the light and the second light beam may be a transmitted component of the light. In some embodiments, the first light beam may be a transmitted component of the light and the second light beam may be a reflected component of the light.

In step 804, the first light beam is focused with aid of a first lens module. The first light beam may be directed to (e.g., focused onto) a first sensor with aid of the first lens module. The first lens module may comprise at least one lens. In some embodiments, the first lens module comprises a lens barrel configured to receive the at least one lens. In some embodiments, the first lens module comprises only prime lenses. In some embodiments, the first lens module may have a first focal length. The first focal length may be focal length may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. In some embodiments, the first lens module comprises a wide-angled lens module or a telescope lens module, substantially as described herein.

In step 806, the second light beam is focused with aid of a second lens module. The second light beam may be directed to (e.g., focused onto) a second sensor with aid of the second lens module. The second lens module may comprise at least one lens. In some embodiments, the second lens module comprises a lens barrel configured to receive the at least one lens. In some embodiments, the second lens module comprises only prime lenses. In some embodiments, the second lens module may have a second focal length. The second focal length may be the same as the first focal length. The first focal length may be focal length may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. In some embodiments, the second optical module comprises a wide-angled lens module or a telescope lens module, substantially as described herein.

The optical axis of the first lens module and an optical axis of the second lens module may coincide (e.g., intersect). For example, the optical axis of the first lens module and an optical axis of the second lens module may coincide with respect to an angular bisector of a reflection angle and a refraction angle (e.g., of the optical element). In some embodiments, the optical axes of the first lens module and the second lens module coincide exactly at a point on the optical element. For example, the optical axes of the first lens module and the second lens module may intersect on a surface of the optical element. In some embodiments, the optical axis of the first lens module and an optical axis of the second lens module are perpendicular.

In step 808, a first image (e.g., image data) is captured from the first light beam focused onto the first sensor. The first sensor may aid in capturing the first image, as previously described herein (e.g., by converting optical information into digital information). The first sensor may be a CMOS sensor, CCD sensor, NMOS sensor, BSI-CMOS sensor as previously described herein. The first sensor may have certain characteristics associated with it. For example, the first sensor may have a predetermined size, pixel size, number of pixels, etc as previously described herein. The first image may have a first field of view. In some instances, the first field of view may be less than or equal to 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or 15°.

In step 810, a second image (e.g., image data) is captured from the second light beam focused onto the second sensor. The second sensor may aid in capturing the second image, as previously described herein (e.g., by converting optical information into digital information). The second sensor may be a CMOS sensor, CCD sensor, NMOS sensor, BSI-CMOS sensor as previously described herein. In some instances, both the first sensor and the second sensor may be a CMOS sensor. The second sensor may have certain characteristics associated with it. For example, the second sensor may have a predetermined size, pixel size, number of pixels, etc as previously described herein. The second sensor may have different characteristics from the first sensor. For example, the first sensor and the second sensor may have different sizes (e.g., physical size), different number of pixels, and/or the size of each pixel on the first sensor and the second sensor may be different. In some instances, the first sensor is larger in size than the second sensor. In some embodiments, each individual pixel on the first sensor is equal to or larger than each individual pixel on the second sensor. The second image may have a second field of view. In some instances, the second field of view may be less than or equal to 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or 15°. The second field of view may be different from the first field of view. For example, the second field of view may be about 25%, 50%, 75%, 100%, 125%, 150%, 200%, 300%, 400%, 500%, or 1000% of the first field of view. In some instances, the second field of view may be of a FOV that is narrower than the first field of view. There may be no parallax between the first image and the second image. For example, there may be no displacement or difference in the apparent position of objects within the first image and the second image.

Method 800 may further comprise combining, with aid of one or more processors, the first image and the second image. Combining the image may comprise scaling the first image or the second image. In some instances, the first image is scaled by $$\frac{\text{the first pixel size}}{\text{the second pixel size}}.$$

In some instances, the second image is scaled by $$\frac{\text{the second pixel size}}{\text{the first pixel size}}.$$

In some instances, only the first image or the second image is scaled, but not both. For example, only the image generated (e.g., captured) using a larger sensor between the two sensors (e.g., the first sensor) is scaled. Scaling the first image and/or the second image may utilize a cubic interpolation algorithm or a bilinear interpolation algorithm. The first scaled image and the second image may have the same relative magnification. For example, the relative size of objects within the first scaled image and the second image may be the same. Combining the first image and the second image may comprise fusing the scaled first image and the second image. The fused image may be seamlessly integrated. For example, the scaled first image and the second image may be fused in areas in which a field of view of the first scaled image and the second scaled image overlaps. Portions of the scaled first image may be utilized for areas in which a field of view of the first scaled image and the second scaled image do not overlap if necessary, as described further below. For example, the scaled first image and the second image may be aligned (e.g., at the center). The scaled first image may encompass the second image. The aligned scaled first image and the second image may comprise an overlapping region and a non-overlapping region. For example, the entirety of the second image and an inner portion of the scaled first image may comprise the overlapping region. An outer portion of the scaled first image may comprise the non-overlapping region. The scaled first image and the second image may be fused using a Laplacian pyramid algorithm or a weighted average algorithm. In some embodiments, fusing the scaled first image and the second image may comprise pixel fusion. A fused image may have a better quality image in the overlapping region compared to the scaled first image or the second image. A better quality image as used herein may refer to an image having a higher resolution or more information than another image.

In some embodiments, a desired field of view may be received at the one or more processors. The desired field of view may correspond to a desired magnification, a desired zoom, desired focal length, and the like. For example, the desired field of view may be input by a user as previously described herein (e.g., by zooming image of an environment in real time). The desired field of view may be equal to or narrower than at least one of the first field of view or the second field of view. The desired field of view may be limited to only allow inputs that are equal to or narrower than at least one of the first field of view or the second field of view. If a field of view wider than both the first field of view and the second field of view is selected, an error message may be output (e.g., on a display) to inform the user.

A determination may be made whether the desired field of view is narrower than the narrower first field of view and the second field of view. If the desired field of view is narrower than the first field of view and the second field of view, only the image generated by the larger sensor (e.g., the first sensor) may be utilized in generating a desired image (e.g., image having the desired field of view). For example, digital zoom may be performed on the image generated by the larger sensor (e.g., the first sensor) and be cropped to simulate the image having the desired field of view. In some embodiments, if the desired field of view is narrower than the field of view of an image generated using the smaller sensor (e.g., the second sensor), the scaled first image and the second image (e.g., non-scaled) may be fused to generate an image as previously described herein. The fused image may be scaled to a desired size and/or cropped as appropriate to generate the desired FOV. The combined image may be comprised wholly of the fused parts (e.g., pixel fused parts). If the desired field of view is wider than the field of view of an image generated using the smaller sensor (e.g., but narrower than the field of view of an image generated using the larger sensor), the scaled first image and the second image may be fused to generate a combined image as previously described herein. The fused image may be scaled to a desired size and/or cropped as appropriate to generate the desired FOV. The combined image may be comprised of an inner FOV comprised of the fused parts (e.g., pixel fused parts) and an outer FOV comprised of the scaled first image (e.g., image with the larger FOV). The combined image may have a field of view corresponding to the desired field of view.

Figure 9:
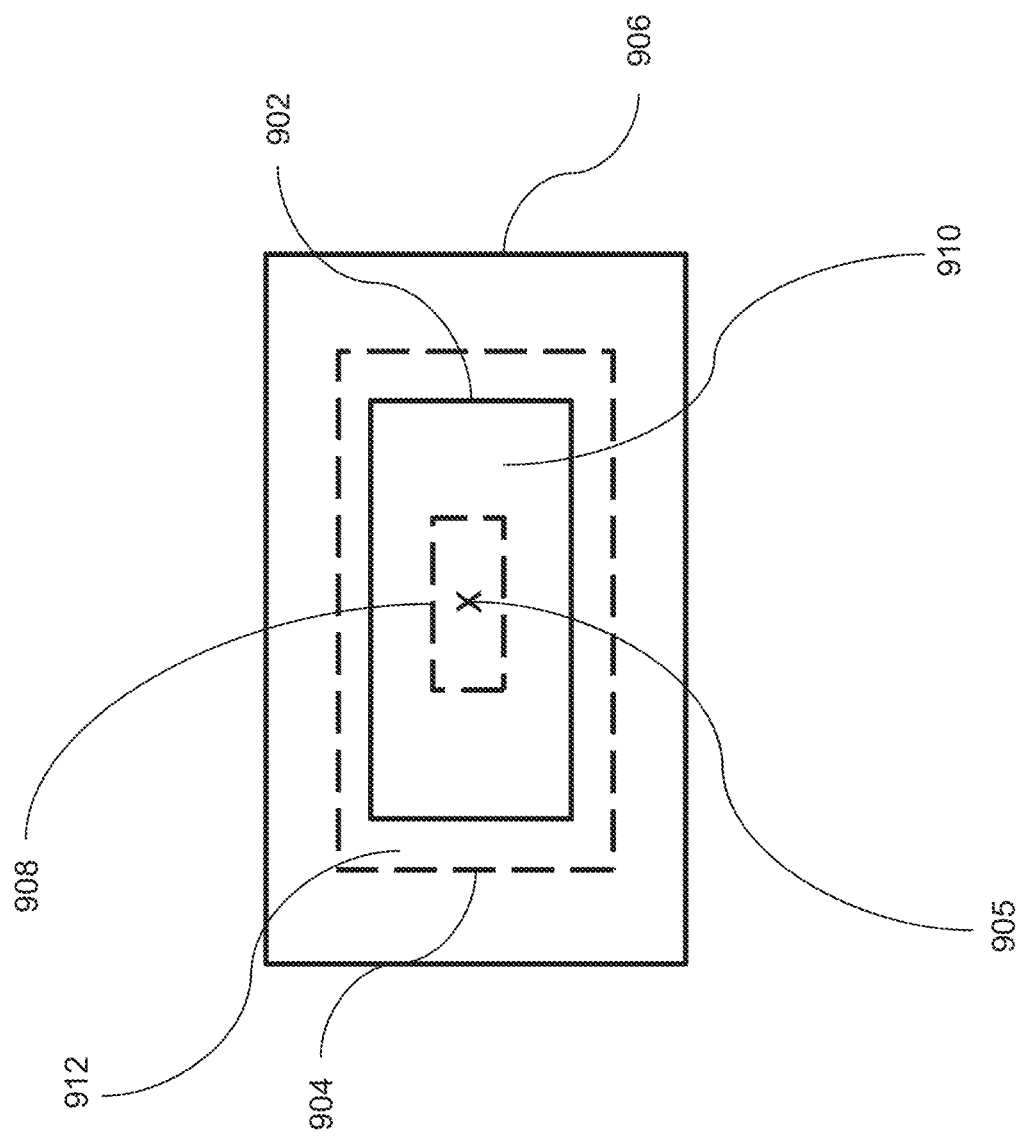
FIG. 9 illustrates an image having a desired FOV, in accordance with embodiments.

FIG. 9 illustrates an image having a desired FOV, in accordance with embodiments. A desired field of view may be received at one or more processors. In some instances, a first image may be acquired using a first lens module and a first sensor and a second image may be acquired using a second lens module and a second sensor. In some instances, the first lens module and the second lens module may be the same type and/or have the same characteristics. In some embodiments, the first sensor and the second sensor may have different characteristics, such as the different sensor sizes, different number of pixels, and/or have different same pixel sizes. In some embodiments, the first sensor may have a larger size compared to the second sensor and each individual pixel size on the first sensor may be equal to or greater than each individual pixel size on the second sensor. In such a case, the first image may be scaled by $$\frac{\text{the first pixel size}}{\text{the second pixel size}}$$

as previously described herein. For example, image 906 may represent a scaled first image and image 902 may represent a second image. When aligned, the scaled first image and the second image may have a common center 905. When aligned, the scaled first image and the second image may have an overlapping portion defined by the field of view of the second image.

The desired field of view may be narrower than a field of view of the second image (e.g., image with the narrower FOV). For example, image 908 may represent an image having a desired field of view (e.g., an image having a desired field of view, image having a desired magnification, etc). Image 908 may be generated by fusing image 902 and image 906. The fused image may be seamlessly integrated. The fused image may be cropped to generate the image 908 having a desired field of view and/or scaled to a desired size (e.g., desired magnification). The image 908 having a desired field of view may comprise only of fused parts (e.g., pixel fused parts).

The desired field of view may be wider than a field of view of the second image (e.g., image with the narrower FOV) but narrower than a field of view of the first image (e.g., image with the wider FOV). For example, image 904 may represent an image having a desired field of view. Image 904 may be generated by fusing image 902 and image 906. The fused image may be cropped to generate the image 904 having a desired field of view and/or scaled to a desired size (e.g., desired magnification). The image 904 having a desired focal length may comprise an inner FOV (e.g., inner portion) 910 comprised of the fused parts (e.g., pixel fused parts) and an outer FOV (e.g., outer portion) 912 comprised of the scaled first image (e.g., image with the larger FOV).

Figure 10:
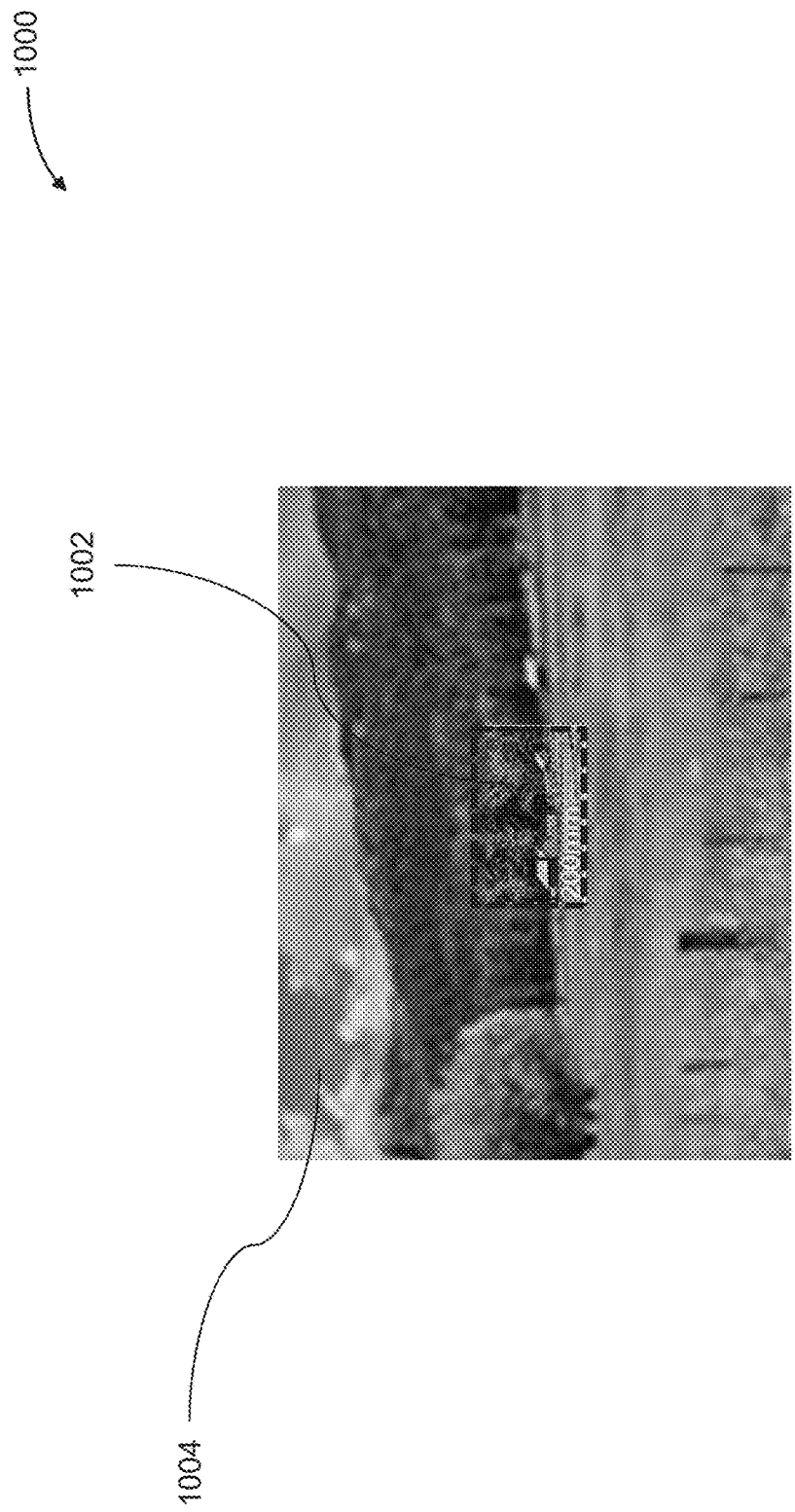
FIG. 10 illustrates an image comprising an inner FOV comprised of fused parts (e.g., pixel fused parts) and an outer FOV comprised of non-fused parts, in accordance with embodiments.

FIG. 10 illustrates an image 1000 comprising an inner FOV comprised of fused parts 1002 (e.g., pixel fused parts) and an outer FOV comprised of non-fused parts 1004, in accordance with embodiments. For example, image 1000 may illustrate an image having a desired focal length between a focal length of a telescope lens module and a wide-angled lens module as described in relation to FIG. 7. Alternatively, image 1000 may illustrate an image having a desired FOV between a first FOV (e.g., FOV of a first scaled image) and a second FOV (e.g., FOV of a second image) as described in relation to FIG. 9.

An imaging system as used herein may be installed on a stationery object or a movable object. A movable object may be capable of self-propelled movement (e.g., a vehicle), while a stationary object may not be capable of self-propelled movement. In some embodiments, the movable object may be an unmanned aerial vehicle (UAV). The UAV may have one or more propulsion units that may permit the UAV to move about in the air. The UAV may be a rotorcraft. In some instances, the UAV may be a multi-rotor craft that may include a plurality of rotors. The plurality or rotors may be capable of rotating to generate lift for the UAV, enabling the UAV to move about freely through the air (e.g., with up to three degrees of freedom in translation and/or up to three degrees of freedom in rotation). In some embodiments, the imaging system of present disclosure may be onboard the UAV. Additional examples of movable objects suitable for use with the embodiments of the present disclosure are provided in further detail below.

Figure 11:
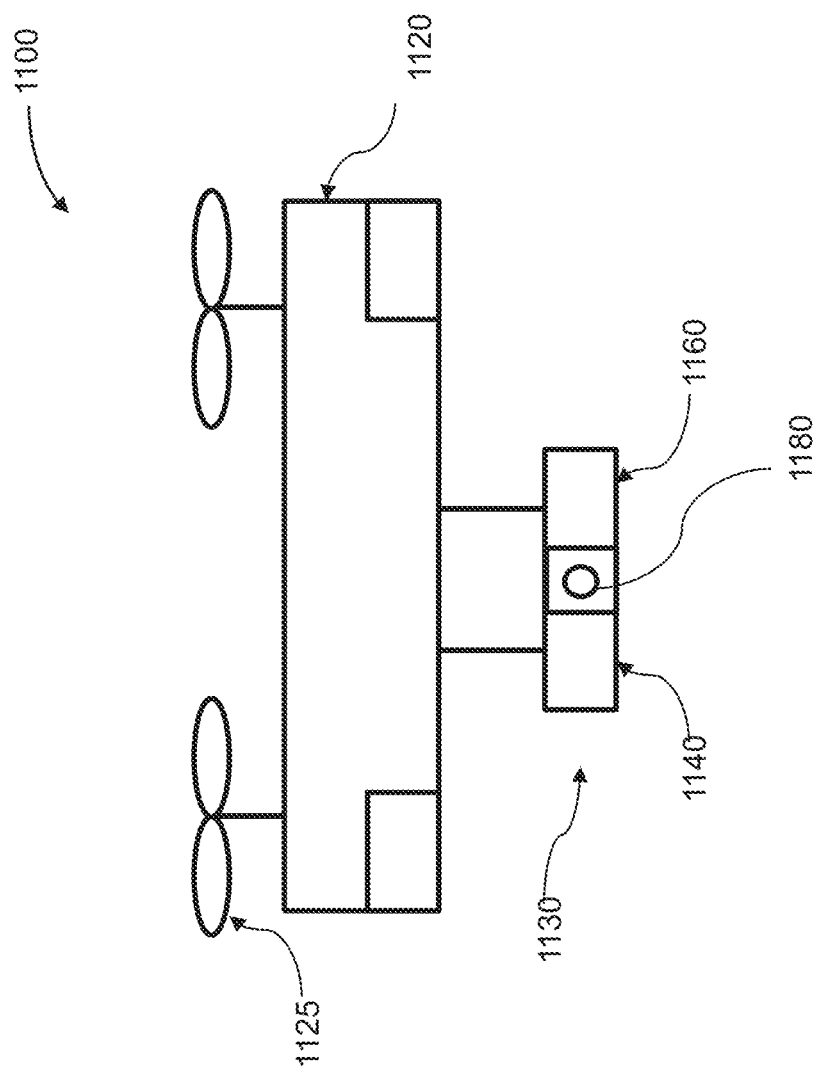
FIG. 11 illustrates an unmanned aerial vehicle (UAV) carrying an imaging system having two or more optical modules, in accordance with embodiments.

FIG. 11 illustrates an unmanned aerial vehicle (UAV) 1100 carrying an imaging system having two or more optical modules, in accordance with embodiments. Any description herein of the imaging system supported by the UAV may apply to any other type of imaging system, or an imaging system supported by any movable object. The UAV may have a body 1120. In some instances, the body may be a central body which may have one or more branching members, or "arms." The arms may extend outward from the central body in a radial manner and be joined via the central body. The number of arms may match the number of propulsion units 1125, or rotors, of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units of the UAV.

An imaging system 1130 may be supported by the UAV. The imaging system may be directly coupled to the UAV or may be coupled to the UAV via a carrier. The imaging system may comprise a plurality of optical modules. For example, one, two, three, four, five, six, or more optical modules may be provided. Any description of a first optical module and a second optical module may apply to any number of optical modules. The imaging system 1130 may be enclosed within a housing, as previously described herein (e.g., light impenetrable housing). In some instances, an aperture 1180 for receiving light may be provided. One, two, three, four, five or more apertures may be provided. Any light received by the imaging system may pass through aperture 1180 before being received by other components of the imaging system. The aperture 1180 may be movable relative to the UAV, relative to the housing, and/or relative to other components of the imaging system. For example, the aperture may be translatable relative to the housing or the UAV. For example, the aperture may be rotatable relative to the housing or the UAV.

The first optical module may be housed within a first location 1140 and second optical module may be housed within a second location 1160. The first optical module and the second optical module may be rigidly coupled to the UAV. Alternatively, the first optical module and second optical module may be permitted to move relative to the UAV 1120 with respect to up to six degrees of freedom. The first optical module and second optical module may be directly mounted onto the UAV, or coupled to a support structure mounted onto the UAV. In some embodiments, the first optical module and second optical module may be an element of a payload of the UAV. In some embodiments, the first optical module and second optical module may be installed on a carrier of the UAV. In some embodiments, the carrier may be a gimbal. In some instances, the first optical module and/or second optical module may be movable relative to one or more propulsion units of the UAV via the carrier. For instance, the carrier may permit rotation of the first optical module and/or the second optical module about at least one axis. Optionally, the carrier permits rotation of the first optical module and/or the second optical module about at least two or three axes. The first optical module and/or second optical module may be movable relative to a central body of the UAV. The first optical module and/or the second optical module may translate relative to the central body of the UAV along one, two, three or more axes.

In some embodiments, the first optical module and second optical module may have the same size. For instance, the first optical module and the second optical module may have the same volume. The first optical module and the second optical module may have one, two, or three of the same dimensions (e.g., length, width, height). The first optical module and the second optical module may have the same weight. Alternatively, the first optical module and second optical module may have different size. For instance, the first optical module and the second optical module may have different volumes. The first optical module may have a volume that is 25%, 50%, 75%, 100%, 125%, 150%, 200%, 300%, 400%, 500%, or 1000% of the second optical module. The first optical module and the second optical module may have one, two, or three different dimensions (e.g., length, width, height). The first optical module and the second optical module may have different weights. The first optical module may have a weight that is 25%, 50%, 75%, 100%, 125%, 150%, 200%, 300%, 400%, 500%, or 1000% of the second optical module.

Each module of an imaging system may have the same optical set-up. Alternatively, each module of the imaging system may have different optical set-ups, or at least two optical modules of an imaging system may have different optical set-ups. In some embodiments, a first optical module may have a stationary lens while a second optical module may have a movable lens. In other embodiments, the first and second optical modules may have movable lenses that may have different dimensions or shapes, or that may move by different amounts. Optical modules of an imaging system may remain stationary relative to one another. Optical modules may remain stationary to one another while the imaging system moves relative to an environment. Alternatively, the optical modules may be movable relative to one another.

Each optical module of the imaging system may capture images of an environment with a field of view. Each optical module of the imaging system may capture images as previously described herein (e.g., without an optical parallax, along the same line of sight, with a same center, with differing fields of views, etc). A field of view of captured by the imaging system may be affected by a variety of factors. In some instances, a direction and/or orientation of the UAV 1100 may affect a FOV of images to be captured by the imaging system. In some instances, configuration a carrier (e.g., gimbal) may affect a FOV. In some instances, configuration of the imaging system components may affect a FOV of images to be captured. For example, movement of aperture 1180 may affect a change in FOV of images to be captured. For example, change in a desired FOV may affect a change in FOV of images to be captured.

In some instances, a FOV of images to be captured may be controlled via an input device such as a remote controller. In some instances, the remote controller may control the UAV (e.g., speed, orientation, movement, position, etc of the UAV), the carrier (e.g., orientation, position, etc of the gimbal), and/or the imaging system (e.g., focal length of the lens modules, desired focal length of images to be captured, aperture orientation, exposure, etc). In some instances, the remote controller may comprise a display for displaying a FOV of the environment to be captured by the imaging system. For example, the display may show an image of an environment that is to be captured by the imaging system in real time. The image shown in the display may change in response to a change in the UAV, the carrier, and or the imaging system. In some instances, the display may show a combined (e.g., fused image) image. The combined image may be a scaled and/or fused image of an image captured by the first optical module and/or an image captured by the second optical module. The combined image may be as described in FIG. 10 (e.g., having an inner FOV (e.g., inner portion) comprised of fused parts (e.g., pixel fused parts) and an outer FOV (e.g., outer portion) comprised of a scaled image. In some instances, a user may select a FOV to be shown in the display, as described further below.

Figure 12:
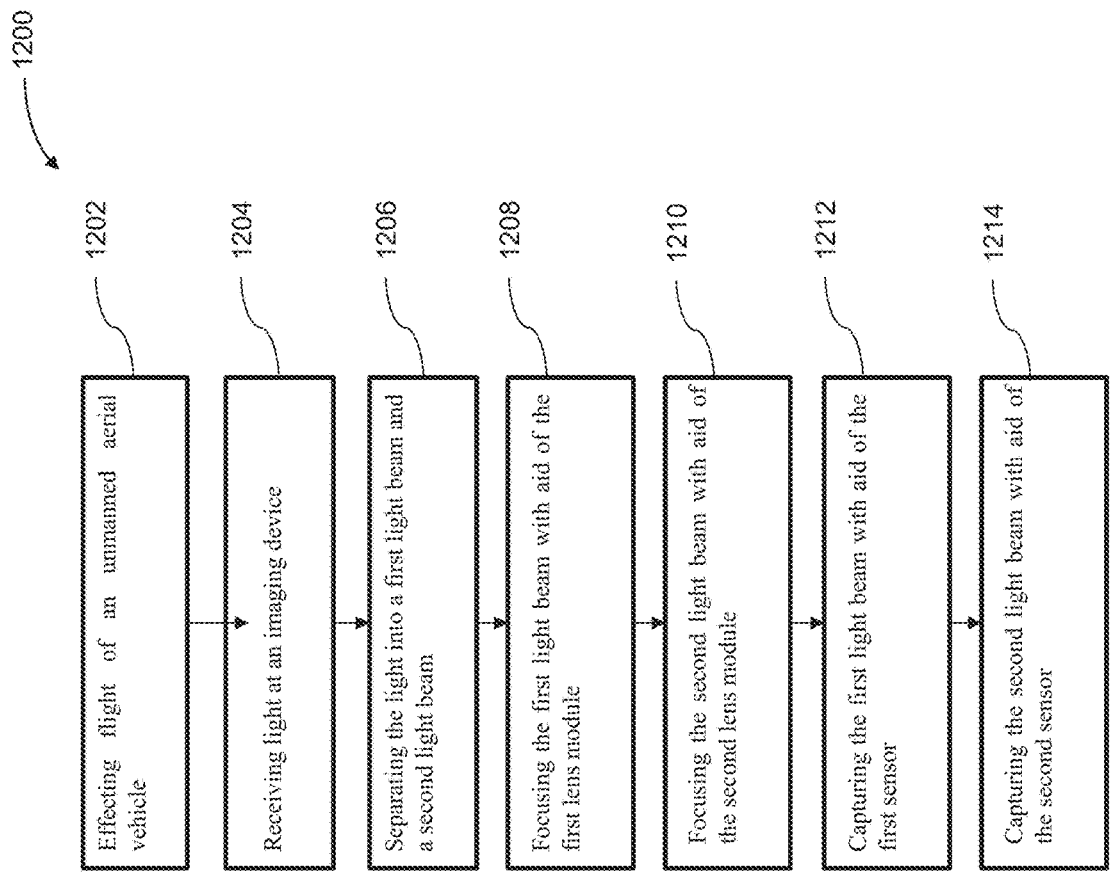
FIG. 12 illustrates a method for generating images, in accordance with embodiments.

FIG. 12 illustrates a method 1200 for generating images, in accordance with embodiments. An imaging device for capturing and/or generating images may be coupled to a UAV. The imaging device may comprise an optical element, a first lens module, a second lens module, a first sensor and a second sensor, and/or one or more processors, as previously described herein.

In step 1202, flight of an unmanned aerial vehicle may be effected. In some instances, the flight of the UAV may be effected manually, semi-automatically, or automatically. For example, the UAV may be configured to fly and follow a preconfigured path. In some instances, the flight of the UAV may be manually controlled by a user (e.g., using a remote control). The imaging device may be configured to capture images of an environment (e.g., in real time) while flight of the UAV is effected. In some instances, a controller may be provided. The controller may control aspects of the UAV, a carrier (e.g., gimbal) coupled to the UAV, and/or the imaging device coupled to the UAV as previously described herein. The controller may affect a field of view to be captured by the imaging device in many different ways. For example, controlling a position and/or orientation of the UAV may affect a FOV of the images to be captured. For example, controlling a position and/or orientation of the carrier may affect a FOV of images to be captured. For example, controlling parameters of the imaging device may affect a FOV of images to be captured. In some instances, a display may be provided (e.g., to a user) who may control operation of the imaging device (e.g., relative direction to the UAV, optical zoom, etc) or what is shown in the display (e.g., digital zoom, inputting a desired focal length, etc). Input of the user may be received in real time.

Step 1204 of receiving light at the imaging device, step 1206 of separating the light into a first light beam and a second light beam, step 1208 of focusing the first light beam with aid of the first lens module, step 1210 of focusing the second light beam with aid of the second lens module, step 1212 of capturing a first image from the first light beam focused by the first lens module onto the first sensor, and step 1214 of capturing a second image from the second light beam focused by the second lens module onto the sensor may be as previously described herein (e.g., as described with respect to FIGS. 2, 4, 8). Method 1200 may further comprise combining, with aid of one or more processors, the first image and the second image as previously described herein. In some instances, a combined image may be shown on the display, as previously described herein. The combined image may be displayed in real time.

In some instances, a user may select a FOV to be shown in the display. For example, the user may select a wider or narrower FOV to be shown in the display. For example, a user may zoom in or out of the image shown in the display via input on the controller (e.g., physical buttons or via touch screen input). In some instances, a user may adjust a FOV shown in the display via input on the controller. For example, the user may adjust the FOV so that the FOV is translated (e.g., up, down, left, right) and/or rotated via physical buttons on the controller or via input on a touch screen. In some instances, a user may select (e.g., via input on a touch screen) a point, portion, or object shown within the display. For example, a user may tap the point, portion, or object shown within the display with a finger. An image shown in the display may be re-centered such that the point, portion, or object selected by the user may be at a center of the display after such selection. After re-centering, the image shown in the display may (again) comprise an inner FOV comprised of fused parts and an outer FOV comprised of a scaled image. For example, the selected point, portion, or object may be displayed with a high quality (e.g., high resolution, pixel fused parts).

The systems and methods described hereinabove may permit a user to view a display of arbitrary field of view. In some instances, an image having a wide field of view may be shown on the display. The image may have differing qualities (e.g., resolution) and/or show differing details at or near a center of the image compared to at or near an edge of the image. For example, if a desired field of view (e.g., field of view selected by a user) is higher than a field of view of at least one optical module is selected, an inner portion of the image may have greater resolution (e.g., detail) than an outer portion of the image. In some instances, a user may view a wide field of view image while still having a highly detailed central portion.

Being able to viewing an image with a wide field of view (e.g., on an image) may enable a user to have a greater awareness of an environment which may be useful for general photography and/or UAV operations. However, while showing a wide field of view image on the display, the imaging systems described herein may concurrently acquire and display detailed images having a narrower field of view (e.g., zoomed image, magnified images, etc) on a central portion of the image. The inner (e.g., central) portion and the outer (e.g., peripheral) portion of the image may be seamless integrated (e.g., by image fusion). In some instances, having a detailed central portion may be useful for general photography and/or UAV operations. In some instances, a detailed central portion may contain useful information that may not be present in an image having a wide field of view (e.g., a non-fused image). In some instances, the useful information may be identifiable by a user and/or one or more processors. For example, a user and/or one or more processors may be able to identify points of interest or objects that would not be present in an image having a wide field of view (e.g., a non-fused image). In some instances, a user may select (e.g., tap) a portion of the inner portion of the image to zoom in on the image. In some instances, a user may swipe a screen of the display to change a center of a field of view of the image shown in the display. In some instances, a user may tap a portion of the outer portion of the image to re-center on a tapped outer portion of the image.

A change in FOV in response to the user selection may be affected by a change in position or orientation of the UAV, a change in position or orientation of a carrier, and/or change in configuration of the imaging system. In some instances, a change in FOV in response to the user selection may be affected according to a predetermined hierarchy or according to a set criteria. For example, in response to a selection of a point shown in the display, a configuration of the imaging system may first be affected (e.g., orientation of the aperture) before affecting a configuration of the carrier and/or UAV.

In the embodiments discussed hereinabove, images may be captured, combined and displayed by the imaging system of the present disclosure. However, the imaging system may also be used to capture and display videos. In some embodiments, both or one of a first video captured by a first optical module having a first FOV or first focal length, and a second video captured by a second optical module having a second FOV or second focal length, may be displayed, as discussed hereinabove. Alternatively, one of the first and second optical modules may capture an image, and the other one of the first and second optical modules may capture a video. Both or only one of the captured image and video may be displayed, in a manner as discussed hereinabove. In some embodiments, a combined video generated from the first video and the second video may be displayed.

The number of the optical modules may not necessarily be two. In some embodiments, the imaging system of present disclosure may comprise three or more optical modules which are configured to capture images and/or video from the same direction. In this case, arbitrary number of a plurality of images and/or videos captured by a plurality of optical modules may be selectively displayed, in a manner as discussed hereinabove.

The imaging system having multiple optical modules of present disclosure may be particularly suitable for aerial vehicles such as UAVs or small movable objects, such as cell phones.

In some instances, the multiple optical modules may be low weight; therefore, one or more additional optical modules onboard the UAV may not add great load to the UAV or adversely affect the flexibility and lifetime of the UAV. In some instances, the dimension of the multiple optical modules may be small if compared with the traditional optical module such as a zoom type optical module having a set of optical lenses.

The UAV carrying an imaging system having multiple optical modules of present disclosure may facilitate a user in image and/or video viewing. In some instances, the user may view the image and/or video of a scene captured by the UAV through a first optical module having a moderate focal length or focal length range. If the user has particular interest on a portion of the scene as displayed, the user can view an enlarged view of the interested point or portion of scene through a second optical module having a larger focal length or focal length range or a combined image generated from image data captured by both the first optical module and the second optical module.

The UAV carrying an imaging system having multiple optical modules of present disclosure may provide more interactive operation with the user. In some instances, the user may view the image and/or video captured by the UAV flying around, and select a point or a portion of interest on the displayed image and/or video. The selection of the point or portion of interest may be implemented by operating buttons provided on the display device or on the UAV. Alternatively, the selection of the point of interest may be implemented by touching soft buttons displayed on a screen of the remote terminal. Optionally, the selection of the portion of interest may be implemented by touching a screen of the remote terminal by multiple fingers of the user. The user may select a desired zoom, FOV and/or focal length of the point or portion of interest to be further displayed on the initial image. Optionally, the user may select a position, a size, a shape and/or a pattern of the point or portion of interest to be further displayed on the initial image.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
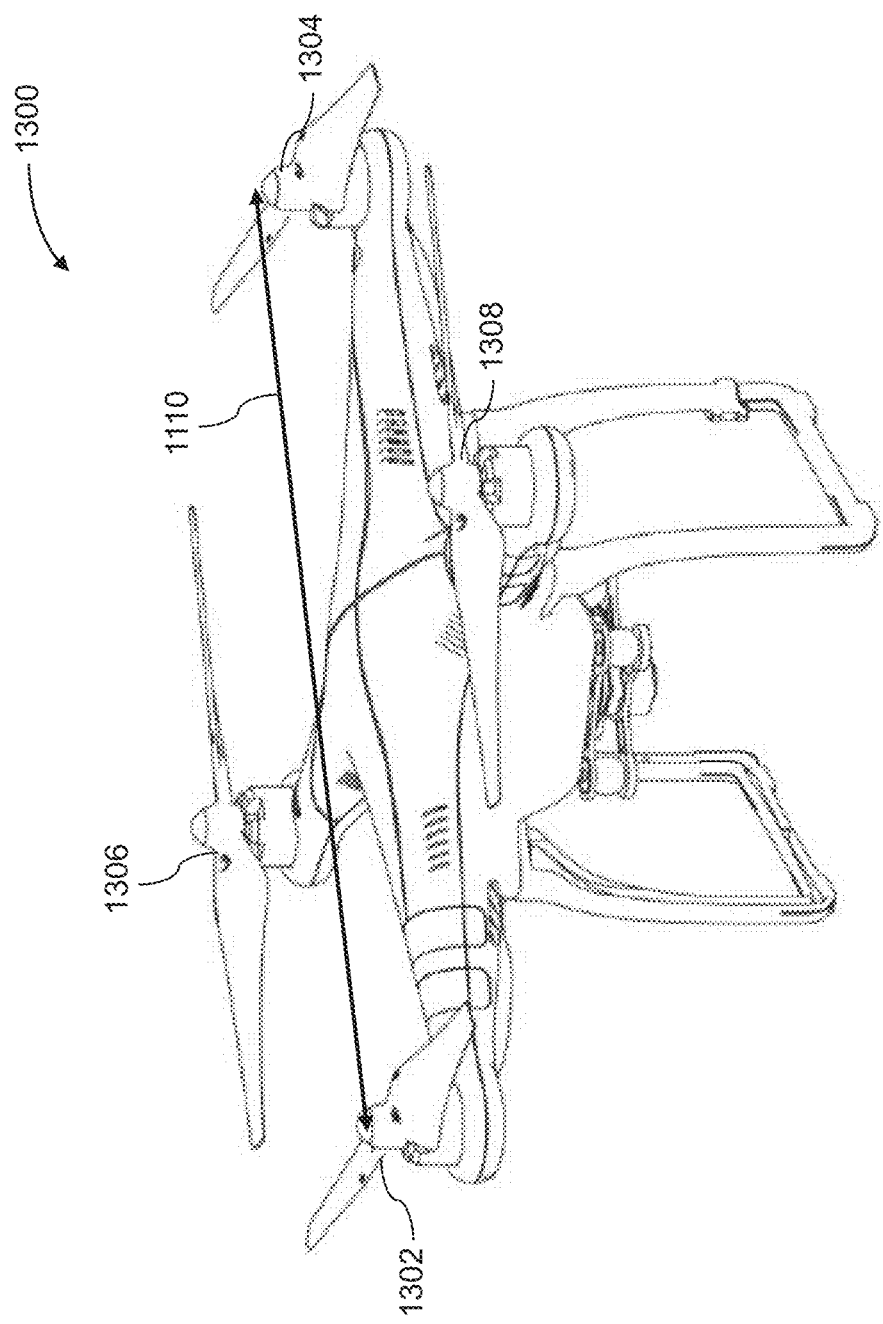
FIG. 13 illustrates an appearance of UAV in accordance with embodiments of the present disclosure.

FIG. 13 illustrates an unmanned aerial vehicle (UAV) 1300, in accordance with embodiments of the present disclosure. The UAV may be an example of a movable object as described herein, to which the method and apparatus of discharging a battery assembly may be applied. The UAV 1300 can include a propulsion system having four rotors 1302, 1304, 1306, and 1308. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1310. For example, the length 1310 can be less than or equal to 2 m, or less than equal to 5 m. In some embodiments, the length 1310 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 14:
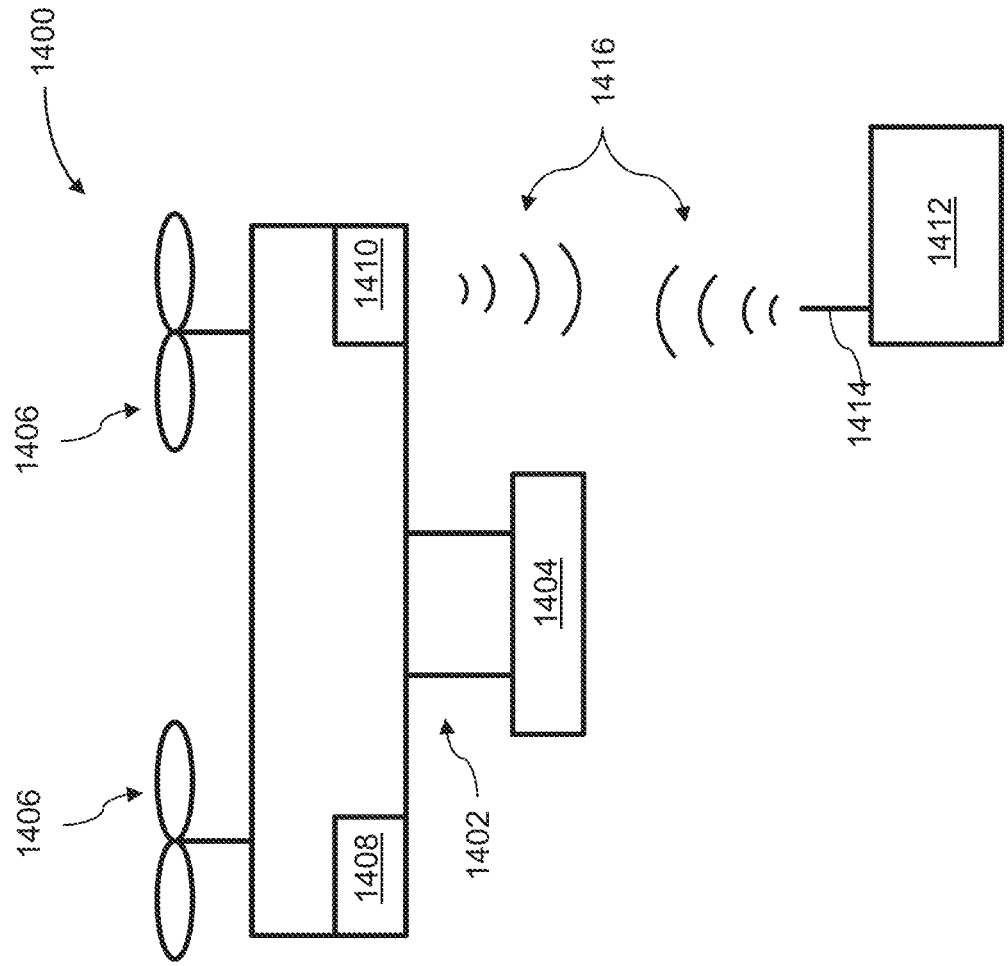
FIG. 14 illustrates a movable object including a carrier and a payload, in accordance with embodiments of the present disclosure.

FIG. 14 illustrates a movable object 1400 including a carrier 1402 and a payload 1404, in accordance with embodiments of the present disclosure. Although the movable object 1400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1404 may be provided on the movable object 1400 without requiring the carrier 1402. The movable object 1400 may include propulsion mechanisms 1406, a sensing system 1408, and a communication system 1410.

The propulsion mechanisms 1406 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1406 can be mounted on the movable object 1400 using any suitable means, such as a support element (e.g., a drive shaft) as described elsewhere herein. The propulsion mechanisms 1406 can be mounted on any suitable portion of the movable object 1400, such on the top, bottom, front, back, sides, or suitable combinations thereof.

In some embodiments, the propulsion mechanisms 1406 can enable the movable object 1400 to take off vertically from a surface or land vertically on a surface without requiring any horizontal movement of the movable object 1400 (e.g., without traveling down a runway). Optionally, the propulsion mechanisms 1406 can be operable to permit the movable object 1400 to hover in the air at a specified position and/or orientation. One or more of the propulsion mechanisms 1400 may be controlled independently of the other propulsion mechanisms. Alternatively, the propulsion mechanisms 1400 can be configured to be controlled simultaneously. For example, the movable object 1400 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1400 (e.g., with respect to up to three degrees of translation and up to three degrees of rotation).

The sensing system 1408 can include one or more sensors that may sense the spatial disposition, velocity, and/or acceleration of the movable object 1400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1408 can be used to control the spatial disposition, velocity, and/or orientation of the movable object 1400 (e.g., using a suitable processing unit and/or control module, as described below). Alternatively, the sensing system 1408 can be used to provide data regarding the environment surrounding the movable object, such as weather conditions, proximity to potential obstacles, location of geographical features, location of manmade structures, and the like.

The communication system 1410 enables communication with terminal 1412 having a communication system 1414 via wireless signals 1416. The communication systems 1410, 1414 may include any number of transmitters, receivers, and/or transceivers suitable for wireless communication. The communication may be one-way communication, such that data can be transmitted in only one direction. For example, one-way communication may involve only the movable object 1400 transmitting data to the terminal 1412, or vice-versa. The data may be transmitted from one or more transmitters of the communication system 1410 to one or more receivers of the communication system 1412, or vice-versa. Alternatively, the communication may be two-way communication, such that data can be transmitted in both directions between the movable object 1400 and the terminal 1412. The two-way communication can involve transmitting data from one or more transmitters of the communication system 1410 to one or more receivers of the communication system 1414, and vice-versa.

In some embodiments, the terminal 1412 can provide control data to one or more of the movable object 1400, carrier 1402, and payload 1404 and receive information from one or more of the movable object 1400, carrier 1402, and payload 1404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1406), or a movement of the payload with respect to the movable object (e.g., via control of the carrier 1402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1408 or of the payload 1404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1412 can be configured to control a state of one or more of the movable object 1400, carrier 1402, or payload 1404. Alternatively or in combination, the carrier 1402 and payload 1404 can also each include a communication module configured to communicate with terminal 1412, such that the terminal can communicate with and control each of the movable object 1400, carrier 1402, and payload 1404 independently.

In some embodiments, the movable object 1400 can be configured to communicate with another remote device in addition to the terminal 1412, or instead of the terminal 1412. The terminal 1412 may also be configured to communicate with another remote device as well as the movable object 1400. For example, the movable object 1400 and/or terminal 1412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1400, receive data from the movable object 1400, transmit data to the terminal 1412, and/or receive data from the terminal 1412. Optionally, the remote device can be connected to the Internet or other telecommunications network, such that data received from the movable object 1400 and/or terminal 1412 can be uploaded to a website or server.

Figure 15:
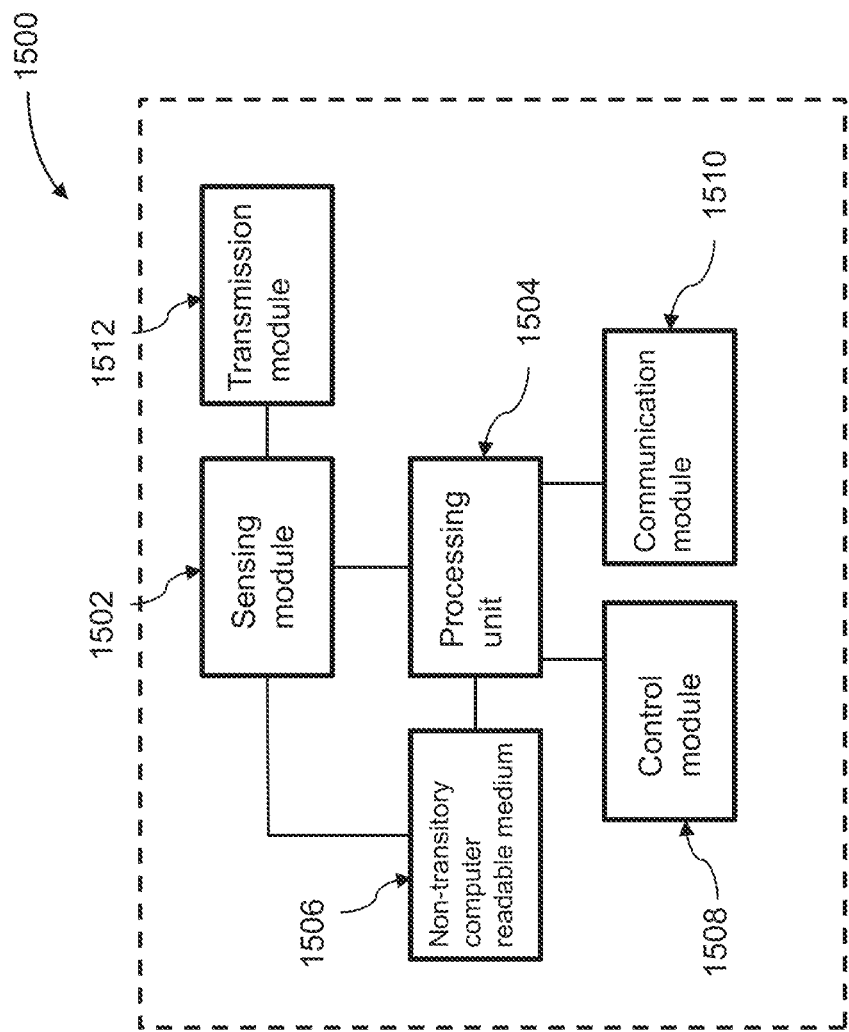
FIG. 15 is a schematic illustration by way of block diagram of a system for controlling a movable object, in accordance with embodiments of the present disclosure.

FIG. 15 is a schematic illustration by way of block diagram of a system 1500 for controlling a movable object, in accordance with embodiments of the present disclosure. The system 1500 can be used in combination with any suitable embodiment of the systems, devices, and methods disclosed herein. The system 1500 can include a sensing module 1502, processing unit 1504, non-transitory computer readable medium 1506, control module 1508, and communication module 1510.

The sensing module 1502 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1502 can be operatively coupled to a processing unit 1504 having a plurality of processors. In some embodiments, the sensing module can be operatively coupled to a transmission module 1512 (e.g., a Wi-Fi image transmission module) configured to directly transmit sensing data to a suitable external device or system. For example, the transmission module 1512 can be used to transmit images captured by a camera of the sensing module 1502 to a remote terminal.

The processing unit 1504 can have one or more processors, such as a programmable processor (e.g., a central processing unit (CPU)). The processing unit 1504 can be operatively coupled to a non-transitory computer readable medium 1506. The non-transitory computer readable medium 1506 can store logic, code, and/or program instructions executable by the processing unit 1504 for performing one or more steps. The non-transitory computer readable medium can include one or more memory units (e.g., removable media or external storage such as an SD card or random access memory (RAM)). In some embodiments, data from the sensing module 1502 can be directly conveyed to and stored within the memory units of the non-transitory computer readable medium 1506. The memory units of the non-transitory computer readable medium 1506 can store logic, code and/or program instructions executable by the processing unit 1504 to perform any suitable embodiment of the methods described herein. For example, the processing unit 1504 can be configured to execute instructions causing one or more processors of the processing unit 1504 to analyze sensing data produced by the sensing module. The memory units can store sensing data from the sensing module to be processed by the processing unit 1504. In some embodiments, the memory units of the non-transitory computer readable medium 1506 can be used to store the processing results produced by the processing unit 1504.

In some embodiments, the processing unit 1504 can be operatively coupled to a control module 1508 configured to control a state of the movable object. For example, the control module 1508 can be configured to control the propulsion mechanisms of the movable object to adjust the spatial disposition, velocity, and/or acceleration of the movable object with respect to six degrees of freedom. Alternatively or in combination, the control module 1508 can control one or more of a state of a carrier, payload, or sensing module.

The processing unit 1504 can be operatively coupled to a communication module 1510 configured to transmit and/or receive data from one or more external devices (e.g., a terminal, display device, or other remote controller). Any suitable means of communication can be used, such as wired communication or wireless communication. For example, the communication module 1510 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1510 can transmit and/or receive one or more of sensing data from the sensing module 1502, processing results produced by the processing unit 1504, predetermined control data, user commands from a terminal or remote controller, and the like.

The components of the system 1500 can be arranged in any suitable configuration. For example, one or more of the components of the system 1500 can be located on the movable object, carrier, payload, terminal, sensing system, or an additional external device in communication with one or more of the above. Additionally, although FIG. 15 depicts a single processing unit 1504 and a single non-transitory computer readable medium 1506, one of skill in the art would appreciate that this is not intended to be limiting, and that the system 1500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1500 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A system comprising:
   an optical element configured to separate light into a first light beam and a second light beam;
   a first lens module configured to focus the first light beam;
   a second lens module configured to focus the second light beam;
   a first sensor configured to capture a first image from the first light beam focused by the first lens module onto the first sensor, the first image having a first field of view;
   a second sensor configured to capture a second image from the second light beam focused by the second lens module onto the second sensor, the second image having a second field of view different from the first field of view; and one or more processors configured to generate a combined image based on the first image and the second image, wherein:

the combined image includes fused parts and a desired field of view of the combined image is greater than the first field of view and the second field of view; or the desired field of view of the combined image is between the first field of view and the second field of view and the combined image includes an inner field of view including the fused parts and an outer field of view including a scaled image generated by scaling one of the first image and the second image that has a wider field of view.

2. The system of claim 1, wherein the first sensor has a first sensor size and the second sensor has a second sensor size different from the first sensor size.

3. The system of claim 2, wherein:

the first sensor size is a first pixel size and the second sensor size is a second pixel size; and the one or more processors are further configured to generate the scaled image by scaling one of the first image and the second image.

4. The system of claim 3, wherein scaling the one of the first image and the second image includes scaling the first image by $$\frac{\text{the first pixel size}}{\text{the second pixel size}}$$

or scaling the second image by $$\frac{\text{the second pixel size}}{\text{the first pixel size}}.$$

5. The system of claim 3, wherein the one or more processors are configured to generate the combined image by aligning the scaled image and an unscaled one of the first image and the second image.

6. The system of claim 3, wherein the one or more processors are configured to generate the combined image by fusing the scaled image and an unscaled one of the first image and the second image.

7. The system of claim 6, wherein the one or more processors are configured to generate the combined image further by scaling the fused image to obtain the desired field of view.

8. The system of claim 1, wherein the light passes through a single aperture prior to contact with the optical element.

9. The system of claim 1, wherein the one or more processors are further configured to receive a desired focal length, and the combined image has the desired field of view corresponding to the desired focal length.

10. A method of capturing images comprising:

separating, with aid of an optical element, light into a first light beam and a second light beam;

focusing, with aid of a first lens module, the first light beam;

focusing, with aid of a second lens module, the second light beam;

capturing, with aid of a first sensor, a first image from the first light beam focused by the first lens module onto the first sensor, the first image having a first field of view;

capturing, with aid of a second sensor, a second image from the second light beam focused by the second lens module onto the second sensor, the second image having a second field of view different from the first field of view; and generating a combined image based on the first image and the second image, wherein:

the combined image includes fused parts and a desired field of view of the combined image is greater than the first field of view and the second field of view; or the desired field of view of the combined image is between the first field of view and the second field of view and the combined image includes an inner field of view including the fused parts and an outer field of view including a scaled image generated by scaling one of the first image and the second image that has a wider field of view.

11. The method of claim 10, wherein the first sensor has a first sensor size and the second sensor has a second sensor size different from the first sensor size.

12. The method of claim 11, wherein:

the first sensor size is a first pixel size and the second sensor size is a second pixel size; and generating the combined image includes scaling one of the first image and the second image to generate the scaled image.

13. The method of claim 12, wherein scaling the one of the first image and the second image includes scaling the first image by $$\frac{\text{the first pixel size}}{\text{the second pixel size}}$$

or scaling the second image by $$\frac{\text{the second pixel size}}{\text{the first pixel size}}.$$

14. The method of claim 12, wherein generating the combined image includes aligning the scaled image and an unscaled one of the first image and the second image.

15. The method of claim 12, wherein generating the combined image includes fusing the scaled image and an unscaled one of the first image and the second image.

16. An image capturing device comprising:

an optical element configured to separate light into a first light beam and a second light beam;

a first lens module configured to focus the first light beam;

a second lens module configured to focus the second light beam;

a first sensor configured to capture a first image from the first light beam focused by the first lens module onto the first sensor, the first image having a first field of view;

a second sensor configured to capture a second image from the second light beam focused by the second lens module onto the second sensor, the second image having a second field of view different from the first field of view; and one or more processors configured to generate a combined image based on the first image and the second image, wherein:

the combined image includes fused parts and a desired field of view of the combined image is greater than the first field of view and the second field of view; or the desired field of view of the combined image is between the first field of view and the second field of view and the combined image includes an inner field of view including the fused parts and an outer field of view including a scaled image generated by scaling one of the first image and the second image that has a wider field of view.

* * * * *